US012612092B2

(12) United States Patent
Satani et al.

(10) Patent No.: US 12,612,092 B2
(45) Date of Patent: Apr. 28, 2026

(54) HOUSING STRUCTURE AND OBJECT USING THE SAME

(71) Applicant: FUJIFILM Business Innovation Corp., Tokyo (JP)

(72) Inventors: Maho Satani, Kanagawa (JP); Takahiro Iizuka, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 594 days.

(21) Appl. No.: 18/163,140

(22) Filed: Feb. 1, 2023

(65) Prior Publication Data

US 2023/0406380 A1 Dec. 21, 2023

(30) Foreign Application Priority Data

Jun. 16, 2022 (JP) .................................. 2022-097410

(51) Int. Cl.
B62B 3/00 (2006.01)
B62B 3/10 (2006.01)
(Continued)

(52) U.S. Cl.
CPC ................ B62B 3/002 (2013.01); B62B 3/10 (2013.01); B62B 5/00 (2013.01); B62B 5/06 (2013.01)

(58) Field of Classification Search
CPC .. B62B 3/002; B62B 3/10; B62B 5/00; B62B 5/06; B62B 5/0433; B62B 5/049;
(Continued)

(56) References Cited

U.S. PATENT DOCUMENTS

| | | | |
|---|---|---|---|
| 7,111,852 B2* | 9/2006 | Woods | B62B 3/00 |
| | | | 312/249.8 |
| 8,498,026 B2* | 7/2013 | Mikuni | H04N 1/1017 |
| | | | 358/1.9 |

(Continued)

FOREIGN PATENT DOCUMENTS

| | | | |
|---|---|---|---|
| CA | 2851900 C | * 11/2021 | ........... B62B 5/0006 |
| CN | 107458701 A | * 12/2017 | ............. B65D 25/24 |

(Continued)

OTHER PUBLICATIONS

Jan. 27, 2026 Office Action issued in Japanese Patent Application No. 2022-097410.

*Primary Examiner* — James A Shriver, II
*Assistant Examiner* — Ian Bryce Shelton
(74) *Attorney, Agent, or Firm* — Oliff PLC

(57) ABSTRACT

A housing structure for wheeled equipment includes a housing with top, bottom, and side portions. Multiple wheeled supports are mounted on the bottom portion to enable movement of the housing. A grip is positioned on the top portion or upper side portion of the housing for manual grasping during tilting operations. A footstep is located at the bottom portion between two rear wheeled supports on the side opposite the advancing direction. The footstep is positioned forward of the center axis of the rear wheels' diameters relative to the housing's advancing direction. This arrangement allows an operator to step on the footstep while gripping the upper portion to tilt the housing backward, with the rear wheel contact points serving as pivot points during the tilting operation.

19 Claims, 20 Drawing Sheets

(51) Int. Cl.
    *B62B 5/00*          (2006.01)
    *B62B 5/06*          (2006.01)

(58) Field of Classification Search
    CPC .... B65D 25/24; B65D 25/2811; B65D 81/02;
         B65D 85/68; B65G 35/00; B65G 43/08;
         B65G 47/22; B65G 2203/0208; B65G
         2203/041
    See application file for complete search history.

(56)          References Cited

U.S. PATENT DOCUMENTS

| | | | | |
|---|---|---|---|---|
| 8,764,031 | B2 * | 7/2014 | Finstad, III | B62B 5/0433 |
| | | | | 280/47.35 |
| 8,888,109 | B2 * | 11/2014 | Stubbs | B65D 19/42 |
| | | | | 280/30 |
| 9,045,253 | B2 * | 6/2015 | Hacko | B62B 5/049 |
| 10,589,771 | B2 * | 3/2020 | Yeo | B62B 5/067 |
| 10,717,456 | B2 * | 7/2020 | Shrago | B62B 5/087 |
| 11,529,985 | B2 * | 12/2022 | Brunner | B62B 3/04 |
| 2005/0242534 | A1 * | 11/2005 | Woods | B62B 3/00 |
| | | | | 280/47.34 |
| 2011/0073725 | A1 * | 3/2011 | Aoyama | B60B 33/0057 |
| | | | | 248/188.8 |
| 2011/0204760 | A1 * | 8/2011 | Finstad, III | B62B 5/0433 |
| | | | | 29/401.1 |
| 2013/0119624 | A1 * | 5/2013 | Stubbs | B62B 5/049 |
| | | | | 280/30 |
| 2013/0121800 | A1 * | 5/2013 | Hacko | B65D 19/42 |
| | | | | 280/30 |
| 2019/0118846 | A1 * | 4/2019 | Shrago | A47C 12/00 |
| 2019/0272400 | A1 * | 9/2019 | Naito | B62B 3/1412 |
| 2021/0009023 | A1 * | 1/2021 | Hoeper | B60P 7/0892 |
| 2021/0094600 | A1 * | 4/2021 | Brunner | B62B 3/04 |

FOREIGN PATENT DOCUMENTS

| | | | | | | |
|---|---|---|---|---|---|---|
| CN | 107695963 | A | * | 2/2018 | | B25H 1/04 |
| CN | 108248655 | A | * | 7/2018 | | B62B 5/0006 |
| CN | 108248660 | A | * | 7/2018 | | B62B 5/0433 |
| CN | 112109780 | A | * | 12/2020 | | B62B 5/0433 |
| CN | 112622997 | A | * | 4/2021 | | B62B 5/06 |
| CN | 112842773 | A | * | 5/2021 | | B62B 3/04 |
| DE | 102020123777 | A1 | * | 3/2022 | | B62B 5/0485 |
| JP | S56143164 | U | | 10/1981 | | |
| JP | 11278279 | A | * | 3/1998 | | |
| JP | H11-278279 | A | | 10/1999 | | |
| JP | 2004189057 | A | * | 7/2004 | | |
| JP | 2006030787 | A | * | 2/2006 | | |
| JP | 2006126605 | A | * | 5/2006 | | |
| JP | 2013535373 | A | | 9/2013 | | |
| JP | 2019043465 | A | * | 3/2019 | | |
| JP | 2019153064 | A | | 9/2019 | | |
| JP | 2020166895 | A | * | 10/2020 | | |
| JP | 2021073585 | A | * | 5/2021 | | |
| KR | 101722756 | B1 | * | 4/2017 | | B62B 3/02 |
| WO | WO-2021160772 | A1 | * | 8/2021 | | B62B 3/1428 |

* cited by examiner

FIG. 1B
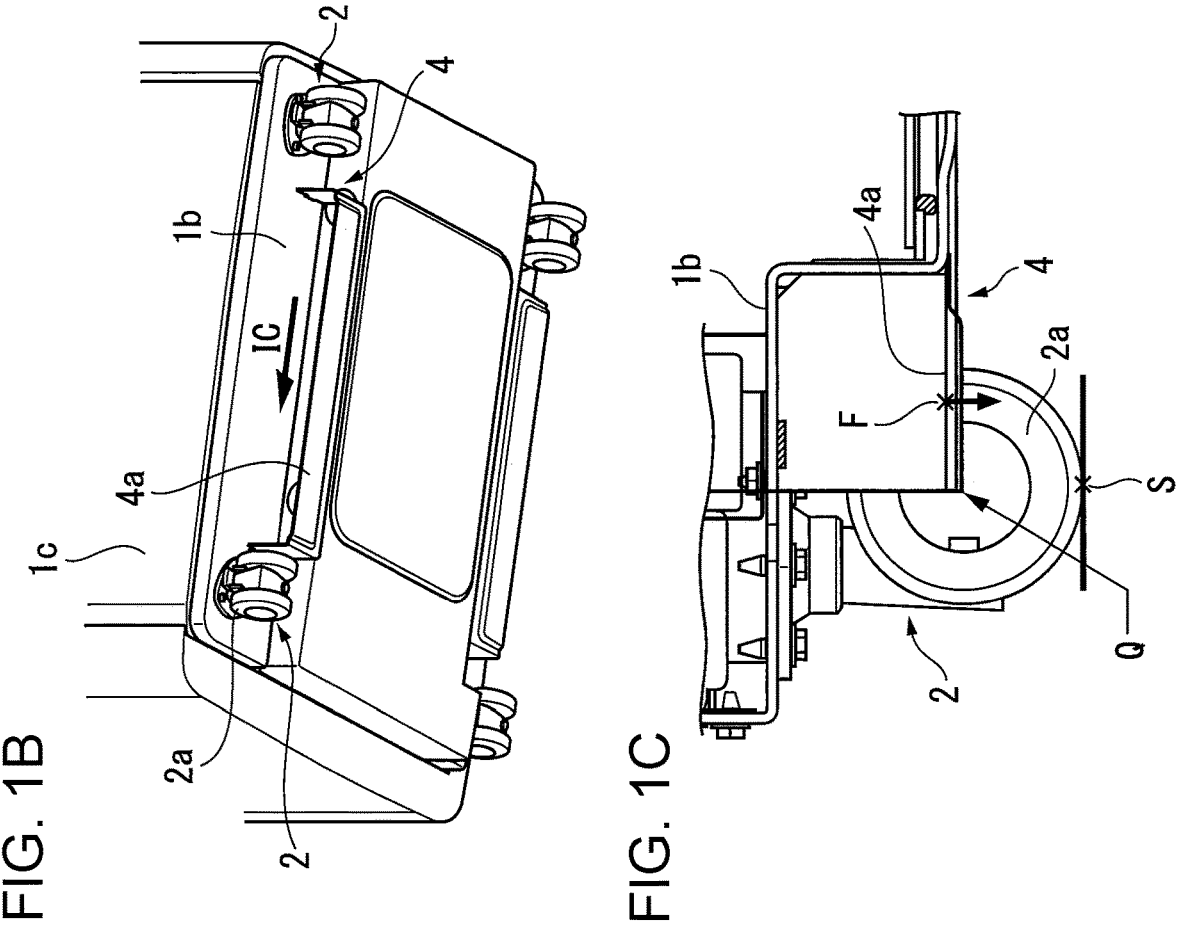
FIG. 1C
FIG. 1A
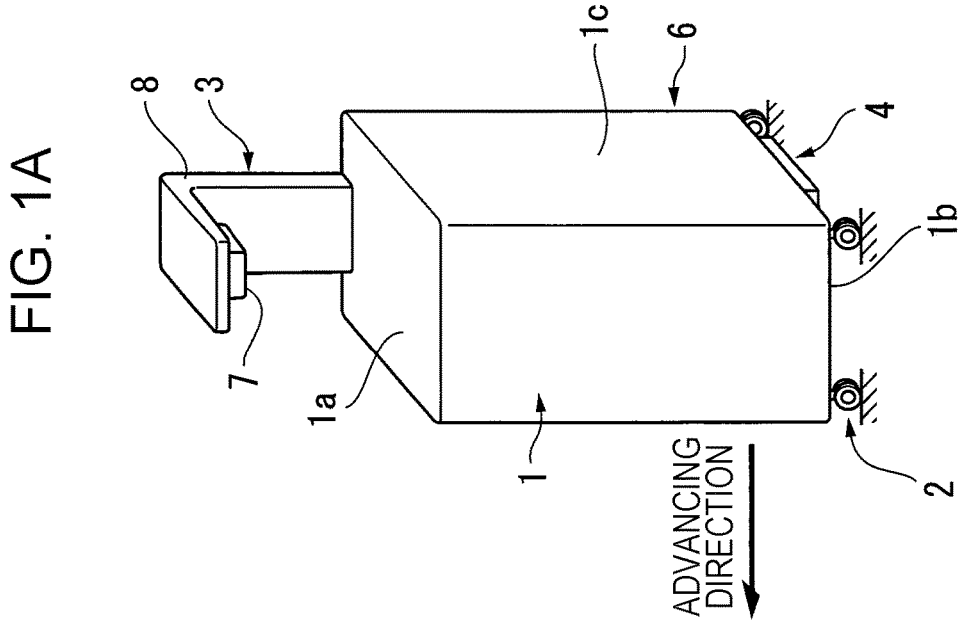
ADVANCING
DIRECTION

FIG. 18

HOUSING STRUCTURE AND OBJECT USING THE SAME

CROSS-REFERENCE TO RELATED APPLICATIONS

This application is based on and claims priority under 35 USC 119 from Japanese Patent Application No. 2022-097410 filed Jun. 16, 2022.

BACKGROUND

(i) Technical Field

The present disclosure relates to a housing structure and an object using the housing structure.

(ii) Related Art

Japanese Unexamined Patent Application Publication No. 2019-43465 (Detailed Description, FIG. 3) and Japanese Unexamined Patent Application Publication No. 11-278279 (Detailed Description, FIG. 2), for example, have already been known as this type of housing structure of related art.

Japanese Unexamined Patent Application Publication No. 2019-43465 discloses a dolly in which a recess recessed inward in plan view is formed between two wheels located at a side of a rear end wall of a dolly body, and when a front end wall of the dolly body is raised by using the two wheels as a rotation axis, a footstep member on which an operator puts his/her foot is provided attachably to and detachably from the recess.

Japanese Unexamined Patent Application Publication No. 11-278279 discloses a cargo transport cart configured such that an operator adjusts the height position of a handle in accordance with the height of the operator, and when front wheels reach a level difference, the operator pulls the handle toward him/her while putting his/her foot on a footstep region to lift up the front of a base to place the front wheels on the level difference, holds a handle portion and lifting up the rear of the base, and places rear wheels on the level difference.

SUMMARY

Aspects of non-limiting embodiments of the present disclosure relate to a housing structure and an object using the housing structure that, when an object including a housing structure including a movable supporter on a bottom portion capable of moving the object is conveyed, in a case where a carrier crosses a level difference that is not able to be crossed by the movable supporter, enable even the carrier alone to safely and easily tilt a housing to cross the level difference without lifting up the housing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a housing structure including: a housing including a top portion and a bottom portion with at least a side portion surrounded by a plane; plural movable supporters that are provided on the bottom portion of the housing and support the housing via wheels capable of moving the housing while two positions separated from each other in a width direction intersecting with a predetermined advancing direction of the housing on a side opposite to the advancing direction serve as support points; a grip provided on the top portion or at an upper half portion of the side portion of the housing and being capable of being gripped with a hand of an operator when the housing is tilted; and a footstep that is provided at the bottom portion of the housing between two movable supporters located on the side opposite to the advancing direction of the housing and on which a foot of the operator is able to be hooked when the housing is tilted, in which the footstep is arranged on an advancing direction side of the housing with respect to center positions of diameters of wheels of the two movable supporters as a boundary.

BRIEF DESCRIPTION OF THE DRAWINGS

Exemplary embodiments of the present disclosure will be described in detail based on the following figures, wherein:

FIG. 1A is an explanatory view illustrating an outline of an exemplary embodiment of an object including a housing structure to which the present disclosure is applied, FIG. 1B is an explanatory view illustrating a major part of the housing structure illustrated in FIG. 1A, and FIG. 1C is an arrow view seen in a direction IC in FIG. 1B;

FIG. 8A is seen obliquely from below;

FIG. 18 is an explanatory view illustrating a principle of an elevating/lowering motion by an elevating/lowering mechanism of the support part;

DETAILED DESCRIPTION

Outline of Exemplary Embodiment

Figure 2B:
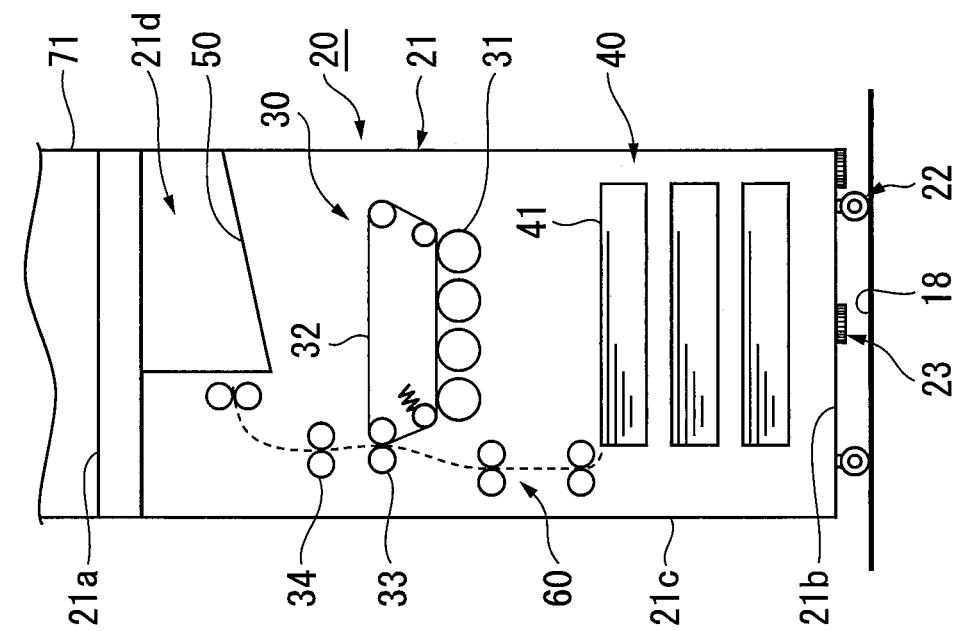
FIG. 2B is an explanatory view illustrating an outline of an entire configuration of the image forming apparatus illustrated in FIG. 2A.

FIG. 1A illustrates an outline of an exemplary embodiment of an object including a housing structure to which the present disclosure is applied.

In the same drawing, an object 6 includes a housing structure including a housing 1 including a top portion 1a and a bottom portion 1b with at least a side portion 1c surrounded by a plane, and plural movable supporters 2 that are provided on the bottom portion 1b of the housing 1 and support the housing 1 via wheels 2a capable of moving the housing 1 while two positions separated from each other in a width direction intersecting with a predetermined advancing direction of the housing 1 on a side opposite to the advancing direction serve as support points. Various object elements are mounted in the housing 1.

The object 6 in this case includes a wide range of products such as a multi-function machine in which functions of a copier, a printer, a scanner, a facsimile, and so forth are combined, home electric appliances, furniture, and so forth, and is assumed to be in an aspect of being conveyed to an installation position in a movable manner using the wheels 2a.

In particular, as illustrated in FIGS. 1A to 1C, the housing structure according to the present exemplary embodiment includes a grip 3 provided on the top portion 1a or at an upper half portion of the side portion 1c of the housing 1 and being capable of being gripped with a hand of an operator when the housing 1 is tilted, and a footstep 4 that is provided at the bottom portion 1b of the housing 1 between two movable supporters 2 located on the side opposite to the advancing direction of the housing 1 and on which a foot of the operator is able to be hooked when the housing 1 is tilted. The footstep 4 is arranged on an advancing direction side of the housing 1 with respect to center positions Q of diameters of wheels 2a of the two movable supporters 2 as a boundary.

With such a configuration, for example, when moving the object 6, even if there is a level difference of an obstacle (for example, a distribution cable covering or the like) which is difficult for the wheels 2a to cross, the operator may keep the object 6 in a tilted posture and make the object 6 to cross the obstacle having the level difference by gripping the grip 3 and stepping on the footstep 4 while the operator stands alone without lifting up the object 6.

In such a technical solution, the housing 1 may include an aspect of a box shape including the top portion 1a and the bottom portion 1b with at least the side portion 1c surrounded by a plane. Even in an aspect in which a cavity portion ensured as a medium output portion for paper or the like is provided in a part of the housing 1, for example, an aspect in which the side portion 1c other than the cavity portion is surrounded by a plane is widely included.

Also, to move the housing 1 in a certain direction, at least one of the plural movable supporters 2 needs to have a wheel 2a whose moving direction changes. Thus, as the two movable supporters 2 located on the side opposite to the advancing direction of the housing 1, there is an aspect having a wheel 2a whose moving direction is fixed or an aspect having a wheel 2a whose moving direction changes.

Further, as the grip 3, a dedicated element may be provided, or an existing element may also serve as the grip 3. Also, the installation position of the grip 3 is not limited to the position on the top portion 1a of the housing 1, and a grip 3 provided at an upper half portion of the side portion 1c is widely included. In this case, the operator in a standing posture may grip the housing 1 when the housing 1 is tilted. In an aspect in which a grip is provided at a lower half portion of the side portion 1c or the bottom portion 1b of the housing 1, it is difficult for the operator to grip the housing 1 when the operator in a standing posture tilts the housing 1, and in an aspect in which a covering member such as a concealing covering is provided around the bottom portion 1b of the housing 1 to such an extent that the wheels 2a of the movable supporters 2 are half concealed, the covering member becomes an obstacle and it is difficult for the operator to lift up the housing 1 by hooking his/her hand to the bottom 1b.

Also, the footstep 4 widely includes those having a footstep portion 4a on which a foot of the operator is able to be hooked. In this case, the footstep portion 4a may be appropriately selected from a recess, a step plate, and so forth as long as the footstep portion 4a has a configuration on which a foot is able to be hooked.

Also, as for the positional relationship between the footstep 4 and the two movable supporters 2 sandwiching the footstep 4, as illustrated in FIG. 1C, the footstep 4 may be arranged on the advancing direction side of the housing 1 with respect to the center positions Q of the diameters of the wheels 2a of the two movable supporters 2 as a boundary.

With the positional relationship as in this aspect, when the housing 1 is tilted, an effort point F upon the foot stepping on the footstep 4 is forward of a ground contact point (corresponding to a fulcrum S) of the wheel 2a with respect to the advancing direction of the housing 1, so that a force exerted on the effort point F causes a force with which the housing 1 advances in the advancing direction. However, since the force accompanying the foot stepping also acts on the fulcrum S of the wheel 2a in a downward pressing direction, rolling of the wheel 2a may be suppressed.

In particular, in the aspect having the wheel 2a whose moving direction changes, while the aspect has the wheel 2a whose moving direction changes around a support shaft extending in the vertical direction, the center position Q of the diameter of the wheel 2a may change in the advancing direction of the housing 1 along with the change of the moving direction of the wheel 2a. In such an aspect, it is necessary that the footstep 4 is arranged on the advancing direction side of the housing 1 with respect to the center position Q of the diameter of the wheel 2a as a boundary regardless of the position of the moving direction of the wheel 2a.

Next, a representative aspect or an exemplary aspect of the housing structure according to the present exemplary embodiment will be described.

First, as an exemplary aspect of the housing structure according to the present exemplary embodiment, an aspect is provided in which the footstep 4 includes a footstep portion 4a that is provided below the bottom portion 1b of the housing 1 and on which the operator puts a distal end portion of his/her foot in a manner that the distal end portion of the foot is able to be hooked. Here, the footstep portion 4a may be integrally provided at the bottom portion 1b of the housing 1, but from the viewpoint of easy construction, an aspect may be provided in which, in the footstep 4, a member constituting the footstep portion 4a is fixed to a bottom frame constituting the bottom portion 1b of the housing 1. In this example, the force accompanying the foot stepping acts on the footstep portion 4a, but a member having a cross-sectional shape with high flexural rigidity may be firmly secured to an attachment portion by welding or the like so that the member is less likely to be deformed even when the force accompanying the foot stepping acts thereon.

Also, from the viewpoint of keeping good appearance quality of the housing structure in a case where the footstep 4 is not used, an aspect is provided in which the footstep 4 is covered with a detachable covering (not illustrated) when not in use, and the covering is removed when in use.

Further, although the footstep 4 functions for foot stepping, the footstep 4 may have other functions, and for example, the footstep 4 may also serve as an attachment portion to which an overturning-prevention support part (not illustrated) is attached.

Also, as an exemplary aspect of the footstep 4, an aspect is provided in which the footstep 4 is arranged on the advancing direction side of the housing 1 so as to include the center positions Q of the diameters of the wheels 2a of the two movable supporters 2 sandwiching the footstep 4. In this example, the footstep 4 is in an aspect in which the effort point F and the fulcrum S are on the same straight line (an aspect in which the entrance position of the footstep 4 coincides with the center positions Q of the diameters of the wheels 2a), and rolling of the wheels 2a is further suppressed as compared with a case where the effort point F and the fulcrum S are not arranged on the same straight line.

Further, as another exemplary aspect of the footstep 4, an aspect is provided in which the footstep 4 is provided between the center positions Q of the diameters of the wheels 2a of the two movable supporters 2 sandwiching the footstep 4 and the bottom portion 1b of the housing 1. In this example, as compared with an aspect in which the footstep 4 is arranged below the center positions Q of the diameters of the wheels 2a, it is likely to ensure a distance between the footstep 4 and the ground contact surface of the wheels 2a when the object 6 is conveyed, and the footstep 4 is less likely to collide with an obstacle by that amount, so that the traveling performance by the movable supporters 2 is appropriately kept.

Also, as an exemplary aspect of the grip 3, an aspect is provided in which the grip 3 is provided so as not to protrude outward from the side portion 1c of the housing 1. In this example, even when the housing structure has a small ground contact surface area, the grip 3 does not become an external protrusion protruding outward from the side portion 1c of the housing 1, and the appearance quality of the housing 1 is kept.

In particular, in this example, as an exemplary aspect of the grip 3, an aspect is provided in which the grip 3 also serves as a supporter 8 that is provided on the top portion 1a of the housing 1 and supports a reading unit 7 that reads a target to be read placed on the top portion 1a of the housing 1. With this example, the operator in a standing posture may easily grip the apparatus and an existing element may be used as the grip 3.

Hereinafter, the present disclosure will be described in more detail with reference to exemplary embodiments illustrated in the accompanying drawings.

First Exemplary Embodiment

Figure 2A:
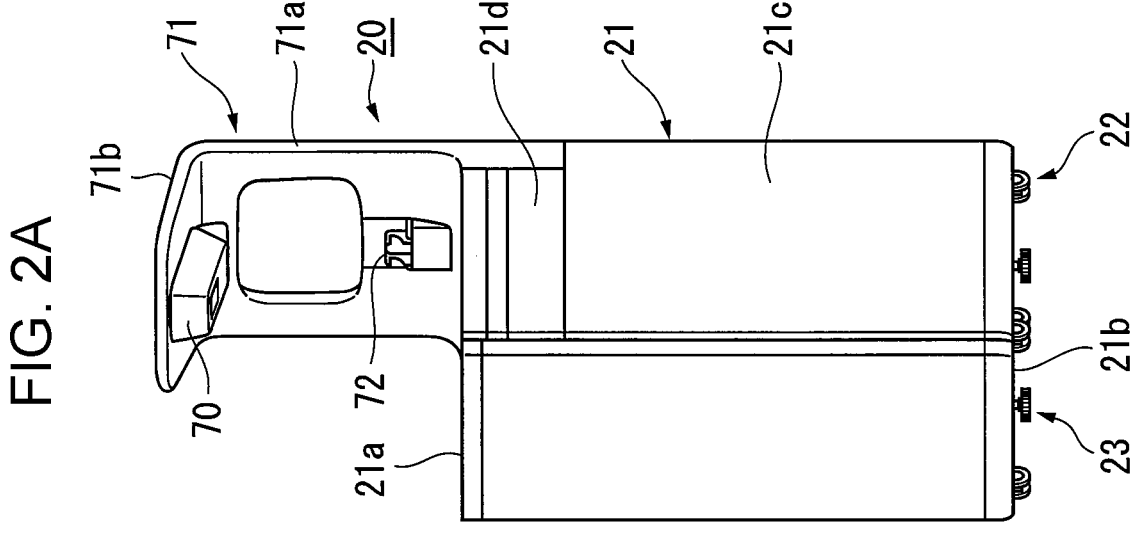
FIG. 2A is an explanatory view illustrating an appearance of an image forming apparatus as an object according to a first exemplary embodiment.

FIG. 2A illustrates an overall configuration of an image forming apparatus as an object according to a first exemplary embodiment.
Overall Configuration of Image Forming Apparatus In the same drawing, an image forming apparatus 20 includes an apparatus housing 21 and elements necessary for image formation as various object elements mounted in the apparatus housing 21.

In this example, as illustrated in FIG. 2A, the apparatus housing 21 is configured in a vertically long substantially rectangular-parallelepiped shape including a top portion 21a and a bottom portion 21b with a side portion 21c surrounded by a plane, and, when it is assumed that a user operation side is a near side, has a shape with a cavity portion 21d near the top portion 21a in one side surface (right side surface in the drawing) adjacent to the near side.

Also, in this example, for example, as illustrated in FIG. 2B, the apparatus housing 21 includes, as the elements necessary for image formation, an image forming engine 30 that is mounted in an upper region in the apparatus housing 21 and that forms an image on a medium 41 such as paper, a medium feed device 40 that is mounted in a lower region in the apparatus housing 21 and feeds a medium 41 such as paper toward the image forming engine 30, a medium output receiver 50 that is provided using the cavity portion 21d of the apparatus housing 21 and that receives the medium 41 with the image formed by the image forming engine 30 and output thereon, a medium transport system 60 that transports the medium 41 fed from the medium feed device 40 to the medium output receiver 50 via the image forming engine 30, and an imaging device (for example, a camera) 70 arranged above and facing the top portion 21a of the apparatus housing 21 so as to read a target to be read placed on the top portion 21a.

In this example, a support arm 71 having an L-shaped cross section is provided on one side of the top portion 21a of the apparatus housing 21. The support arm 71 has a vertical arm portion 71a extending upward and a horizontal arm portion 71b projecting from the distal end of the vertical arm portion 71a to above the top portion 21a so as to face the top portion 21a, and the imaging device 70 is supported on the lower surface of the horizontal arm portion 71b.

In this example, an operation panel attachment portion 72 is provided in the middle of the vertical arm portion 71a of the support arm 71. The operation panel attachment portion 72 detachably holds an operation panel (not illustrated) with which an operation necessary for image formation is performed with respect to a control device (not illustrated) that controls the image forming engine 30, the medium feed device 40, and the medium transport system 60.

In this example, the image forming engine 30 includes plural image forming units 31 that form plural color component images on plural photoreceptors, for example, by an electrophotographic system, a belt-shaped intermediate transfer body 32 that first-transfers and transports the color component images of the image forming units 31, a transfer device 33 that transfers the first-transferred images on the intermediate transfer body 32 to the medium 41, and a fixing device 34 that fixes the transferred images to the medium 41. However, of course, the configuration is not limited thereto.

Also, in this example, the medium feed device 40 includes three medium feed units, but the number, layout, and so forth thereof may be appropriately changed in design, and a manual-insertion medium feed unit may be added as necessary.

Further, the medium output receiver 50 may also be appropriately changed in design in accordance with the output position of the medium 41, and the medium transport system 60 may also form images on both sides of the medium 41 by adding, for example, a double-sided transport module although a transport system of forming an image on one side of the medium 41 is employed in this example.

Bottom Support Structure of Apparatus Housing

In this example, a bottom support structure of the apparatus housing 21 is provided at each of plural positions (four corners in this example) on the lower surface of the bottom portion 21b of the apparatus housing 21, and includes a caster 22 as a movable supporter that conveys the apparatus housing 21 movably in a certain direction and a support part 23 that stably supports the apparatus housing 21 when the image forming apparatus 20 is installed.

Caster

As illustrated in FIGS. 3A to 5B, the caster 22 has a configuration movable in a certain direction, an attachment plate 81 is attached to each of four corners of the lower surface of the bottom portion 21b of the apparatus housing 21, a wheel holder 82 is rotatably provided on the attachment plate 81 via a bearing (not illustrated) with respect to a support shaft suspended in the vertical direction, and an axle 84 of paired wheels 83 is rotatably held by the wheel holder 82. Reference numeral 85 in the drawing denotes a stopper that stops the rotation of the wheels 83 of the caster 22.

Also, in this example, any of the casters 22 has an aspect in which the moving direction changes; however, to move the apparatus housing 21 in a certain direction, at least one of the casters 22 may have an aspect in which the moving direction changes, and the remaining casters 22 may have an aspect in which the moving direction is fixed (the wheel holders 82 do not rotate).

Support Part

In this example, as illustrated in FIGS. 3A to 5B, when it is assumed that a user operation side (U) is a near side, support parts 23 are provided, for example, at substantially central positions on one side (left side in the drawing)

adjacent to the near side and on a far side, respectively, on the lower surface of the bottom portion 21b of the apparatus housing 21.

In this example, a drive system of the image forming engine 30 is mounted on the far side of the apparatus housing 21, the cavity portion 21d is provided on the other side (right side in the drawing) adjacent to the near side of the apparatus housing 21, further the support arm 71 is provided on the far side of the top portion 21a of the apparatus housing 21, and the imaging device 70 is supported by the support arm 71. Accordingly, it is expected that the position of the center of gravity of the image forming apparatus 20 is close to the one side (left side in the drawing) adjacent to the near side of the apparatus housing 21 and the far side. Thus, in this example, the position of the center of gravity of the image forming apparatus 20 is taken into consideration, and the support parts 23 are installed at the bottom portion 21b of the apparatus housing 21 on the side on which the image forming apparatus 20 is likely to overturn.

The configuration of the support parts 23 will be described in detail later (see FIGS. 10 and 11).

Footstep Part

Necessity for Installation of Footstep Part

In this example, it is necessary to move the image forming apparatus 20 in the office, for example, when the office is moved or the layout is changed. At this time, the image forming apparatus 20 is movable by the casters 22 after the fixed state by the support parts 23 is released. However, there may be an obstacle having a level difference such as a cable covering that is not able to be crossed by the casters 22, on the floor surface in the office. In such a case, it is necessary to lift up the image forming apparatus to pass through an obstacle having a level difference that is not able to be crossed by the casters 22.

Figure 3A:
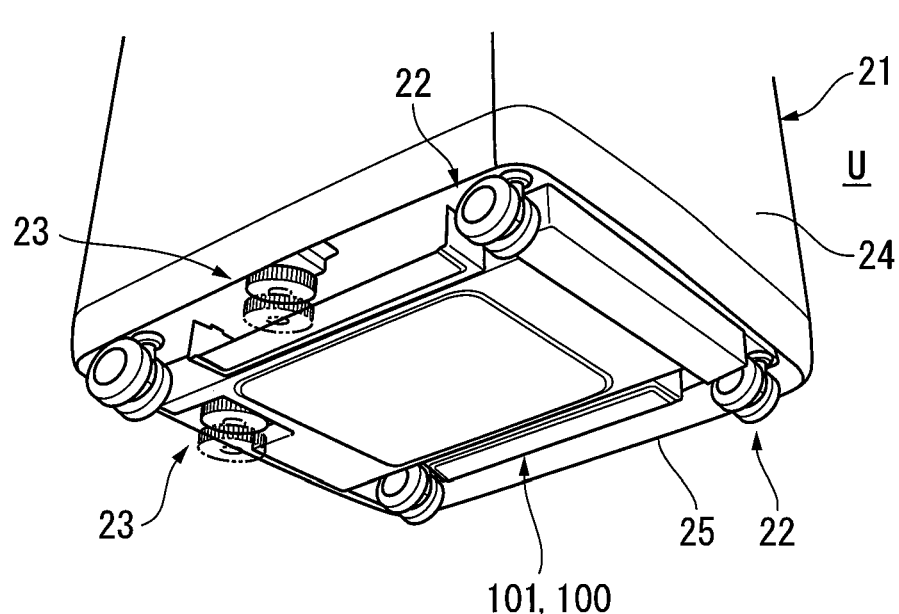
FIG. 3A is an explanatory view illustrating a housing structure at a bottom portion of the image forming apparatus according to the first exemplary embodiment.

However, to lift up the image forming apparatus 20 that is a heavy object, a considerable force is necessary in the first place, and as illustrated in FIG. 3A, a concealing bottom covering 25 may be attached to a lower edge of a side covering 24 constituting the side portion 21c, below the side portion 21c of the apparatus housing 21 to a height at which halves of the casters 22 are concealed. In such an aspect, it is difficult for the operator to lift up the bottom frame constituting the bottom portion 21b of the apparatus housing 21 by hooking his/her hand to the bottom frame.

Thus, in the present exemplary embodiment, a method is found in which, when passing through an obstacle having a level difference that is not able to be crossed by the casters 22, even a single operator in a standing posture is able to cross the level difference of the obstacle by tilting the image forming apparatus 20 without lifting up the image forming apparatus 20.

Figure 3B:
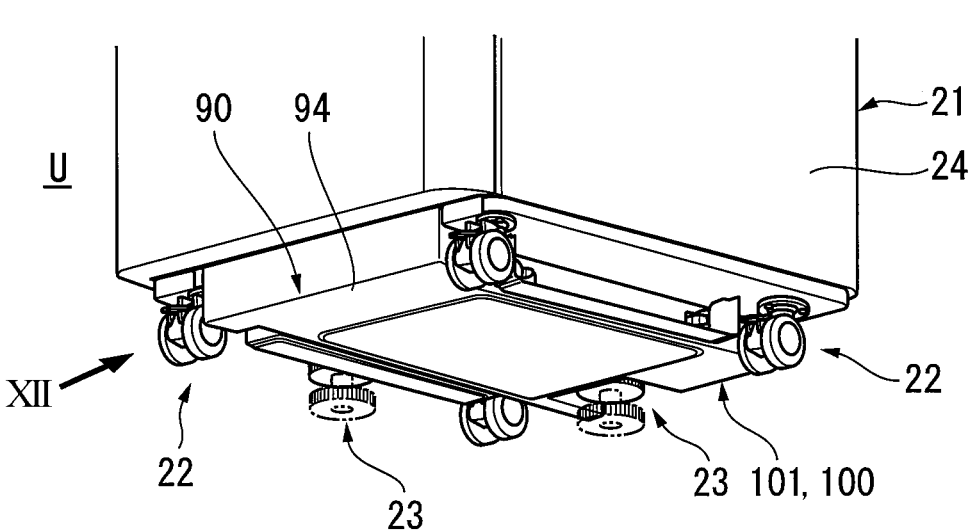
FIG. 3B is an explanatory view illustrating a state in which a bottom covering is removed from the housing structure at the bottom portion illustrated in FIG. 3A.

Specifically, as illustrated in FIGS. 3A and 3B, a footstep part 100 on which the operator is able to step is assembled at an optimum position of the bottom portion 21b of the apparatus housing 21, and the support arm 71 of the apparatus housing 21 is also used as a grip part to be gripped by the operator while the operator steps on the footstep part 100, so that the image forming apparatus 20 is stably held in a tilted posture and the casters 22 easily cross the level difference of the obstacle.

Configuration Example of Bottom Portion of Apparatus Housing

In this example, as illustrated in FIGS. 3A to 5B, and 12, the bottom portion 21b of the apparatus housing 21 is constituted by a bottom frame 90. The bottom frame 90 has a substantially rectangular bottom plate 91; left and right frame members and a rear frame member (hereinafter, simply referred to as frame members 92 (see FIG. 12) as necessary) are secured to both left and right sides and a far side of the bottom plate 91 by welding or the like except a near side of the bottom plate 91; and the frame members 92 on the left and right sides and on the near side reinforce regions on both the left and right sides and the far side of the bottom plate 91 to ensure support strength for the four casters 22 and the two support parts 23.

Further, a recess 94 having a substantially U-shaped cross section is formed in the bottom plate 91 in a region between the casters 22 located on both the left and right sides, the recess 94 extending in the front-rear direction without contacting the casters 22 and recessed downward, and a front frame member 95 is secured to the near side of the bottom plate 91 by welding or the like in a state without contacting an installation surface 18 (see FIG. 2B).

Here, the shape and cross-sectional structure of each of the frame members 92 and 95 may be appropriately selected, but in this example, as the frame members 92 on both the left and right sides and the far side are appropriately selected from those formed in a U-shaped cross section, an L-shaped cross section, and a closed cross section, and used.

Attachment Position of Footstep Part

In this example, as illustrated in FIGS. 3A to 5B, the footstep part 100 is provided between two casters 22 (for example, 22a and 22b) located on the side opposite to the side of a predetermined advancing direction (for example, an H direction in FIG. 4A: corresponding to a direction from the right side to the left side when seen from the near side of the apparatus housing 21) of the apparatus housing 21 in the bottom frame 90 of the apparatus housing 21.

Specifically, in the bottom frame 90, partition walls 97 that partition the recess 94 and protruding walls 98 protruding from the partition walls 97 toward both sides are formed on both sides of the recess 94; the casters 22 are arranged in the front and rear of the protruding walls 98 in L-shaped regions surrounded by the partition walls 97 and the protruding walls 98; and the footstep part 100 is arranged between the casters 22 (specifically, 22a and 22b) in the L-shaped region located on the side opposite to the advancing direction H side of the apparatus housing 21.

Configuration Example of Footstep Part

Figure 4A:
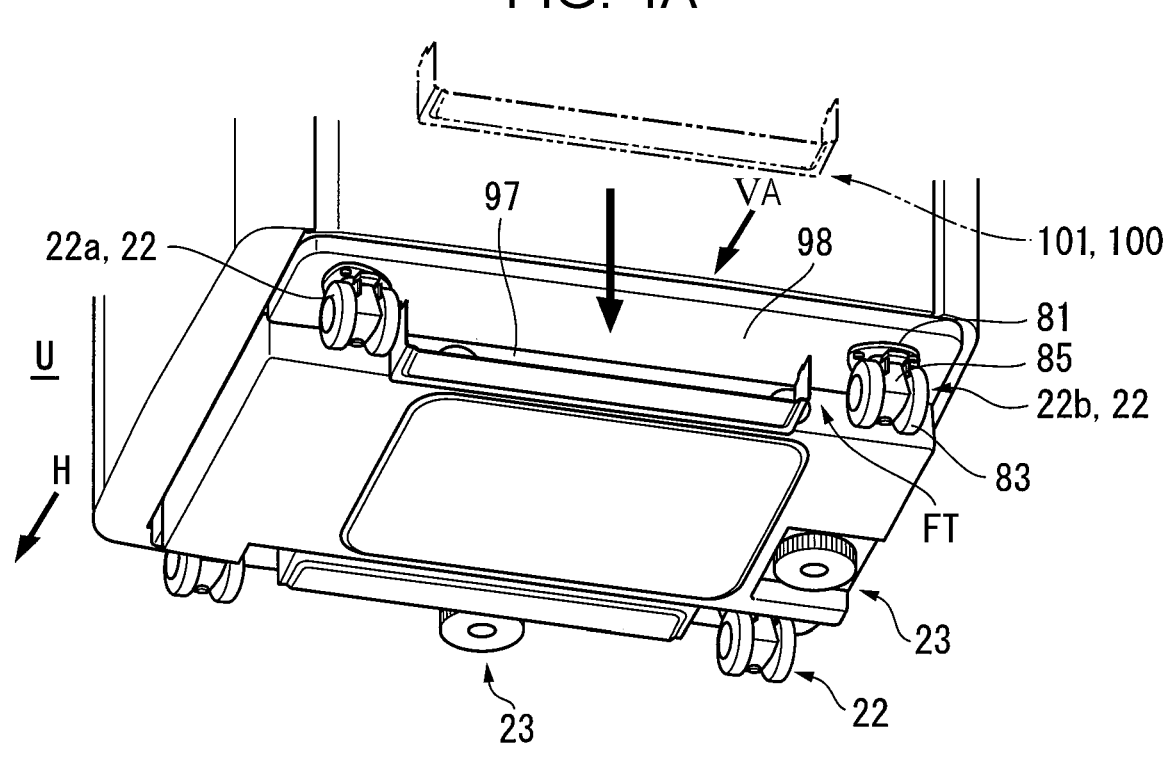
FIG. 4A is an explanatory view illustrating an attachment structure of a footstep part according to the first exemplary embodiment.
Figure 4B:
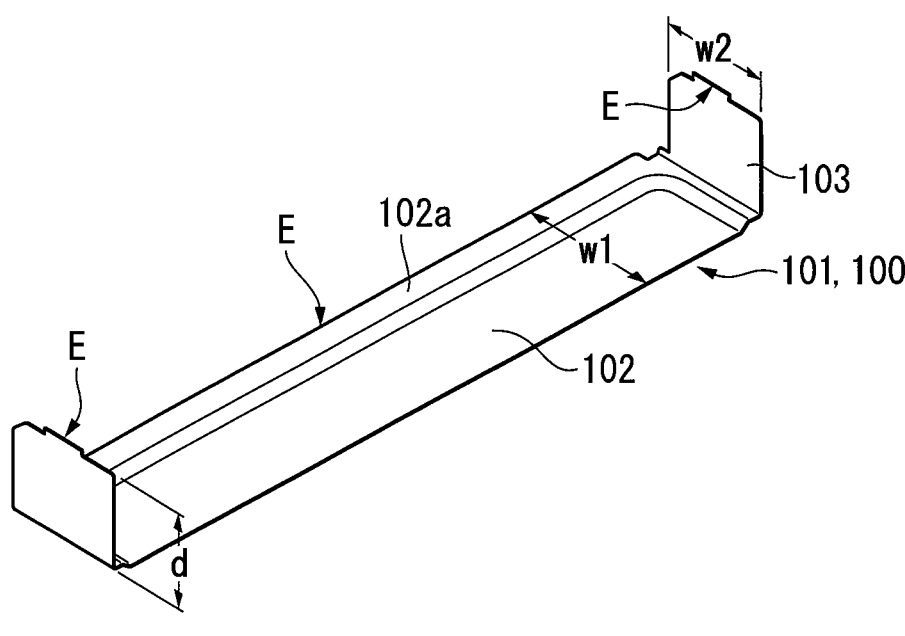
FIG. 4B is an explanatory view illustrating a configuration example of the footstep part.
Figures 5A, 5B:
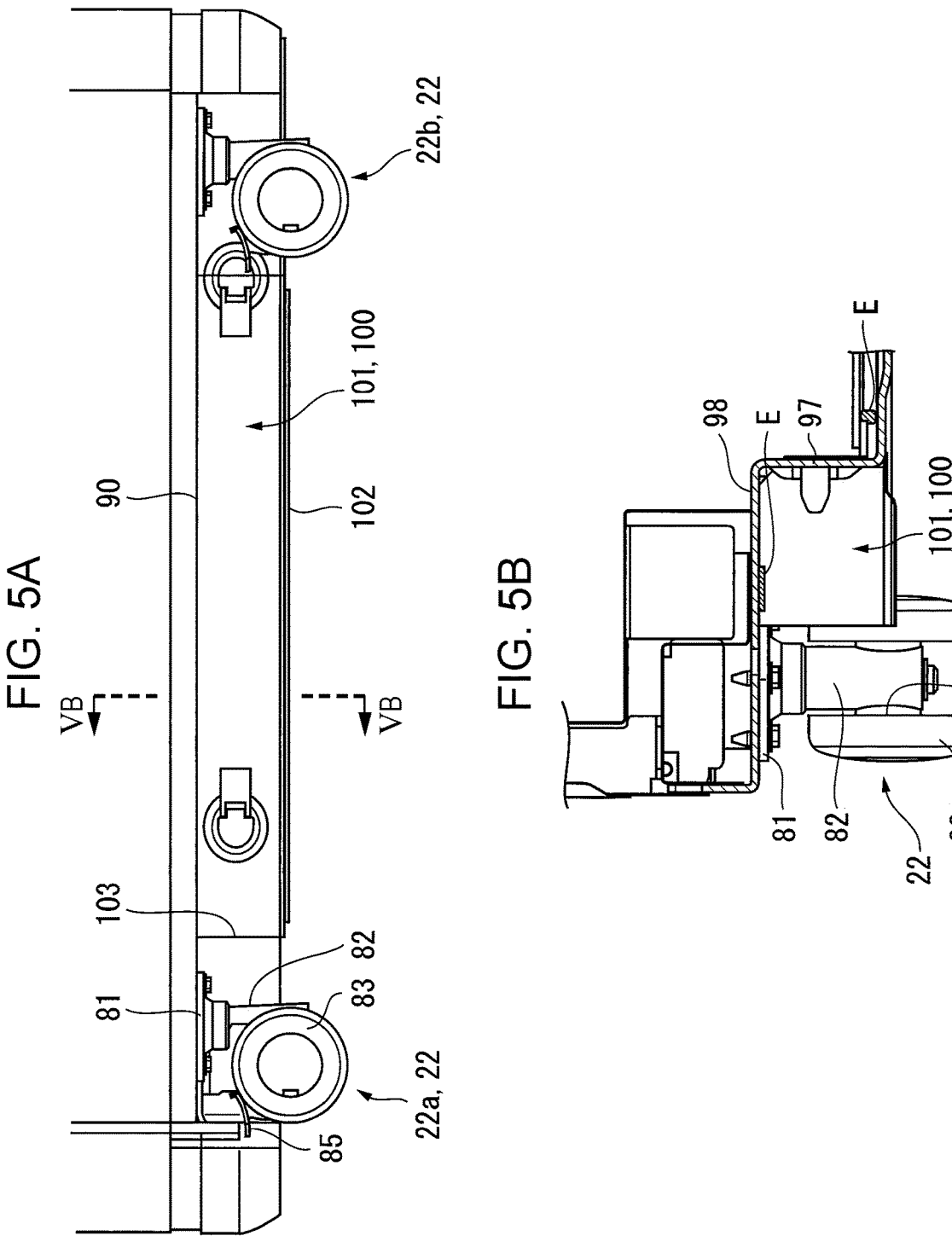
FIG. 5A is an arrow view seen in a direction of arrow VA in FIG. 4A.
FIG. 5B is an explanatory cross-sectional view taken along line VB-VB in FIG. 5A.

In this example, as illustrated in FIGS. 4A and 4B, the footstep part 100 includes a footstep plate 101 integrally formed of a metal material such as steel use stainless (SUS). The footstep plate 101 has an elongated rectangular step plate portion 102 on which the operator puts the distal end portion of his/her foot, and a pair of side plate portions 103 bent substantially at right angles on both sides of the step plate portion 102, and is formed in a channel shape in cross section by the step plate portion 102 and the pair of side plate portions 103.

Further, in this example, a width dimension w1 of the step plate portion 102 in the short-side direction is set to be slightly larger than a width dimension w2 of the side plate portion 103, and a far side portion of the step plate portion 102 is formed as a projecting portion 102a that projects with respect to the side plate portion 103.

Here, the dimensions of the step plate portion 102 and the pair of side plate portions 103 of the footstep plate 101 are selected such that a space region surrounded by the step plate portion 102 and the pair of side plate portions 103 ensures a space necessary and sufficient for accommodating the distal end portion of the foot of the operator. Further, a height dimension d of the pair of side plate portions 103 is selected to be substantially equal to the height dimension of the partition walls 97 of the recess 94.

Attachment Structure of Footstep Part

As illustrated in FIGS. 4A to 5B, the attachment structure of the footstep part 100 may be such that the footstep plate 101 is arranged with its U-shape facing upward, the far-side edge portions and upper end portions of the pair of side plate portions 103 of the footstep plate 101 abut against the partition walls 97 and the protruding walls 98 of the bottom frame 90, the projecting portion 102a of the step plate portion 102 of the footstep plate 101 abuts against the lower edges of the partition walls 97 of the bottom frame 90, the projecting portion 102a of the step plate portion 102 is secured to the lower edges of the partition walls 97 by welds E, and the upper end portions of the pair of side plate portions 103 are secured to the lower surfaces of the protruding walls 98 by the welds E.

Accordingly, the footstep part 100 is firmly assembled to the bottom frame 90, and functions as a footstep portion FT when the image forming apparatus 20 is tilted.

As for the attachment structure of the footstep part 100, of course, a method other than that in the exemplary embodiment (securing using a fastener or the like) may be used.

Concealing Structure of Footstep Portion

In this example, as illustrated in FIG. 3A, the footstep portion FT is covered with the bottom covering 25 as a covering when not in use, and is concealed from the outside. Also, as illustrated in FIG. 3B, the footstep portion FT is exposed by removing the bottom covering 25 when in use.

Figure 6:
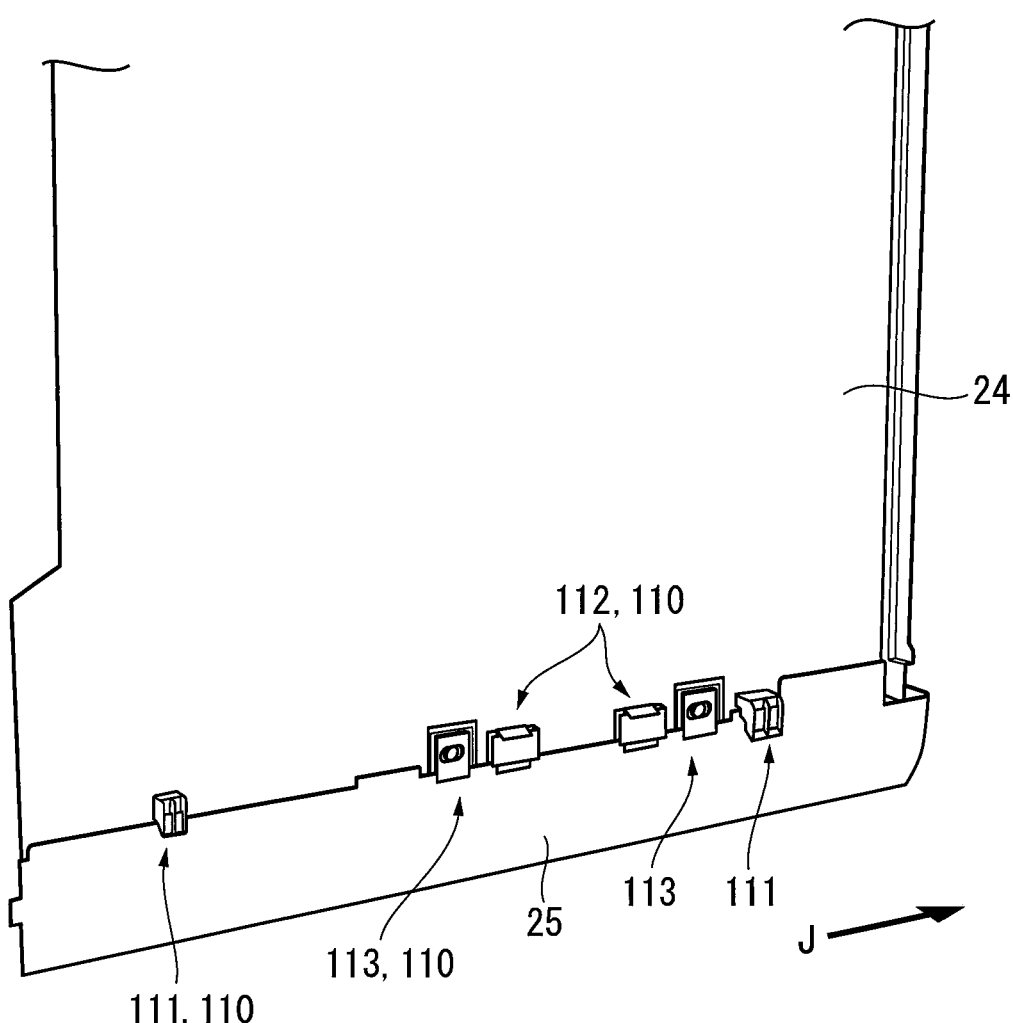
FIG. 6 is an explanatory view illustrating an example of a bottom covering that conceals the footstep part.

In this example, as illustrated in FIG. 6, the bottom covering 25 is attached to and detached from the lower edge of the side covering 24 constituting the side portion 21c of the apparatus housing 21 via an attachment/detachment mechanism 110. FIG. 6 is an explanatory view illustrating a state in which the side covering 24 and the bottom covering 25 are seen from inside.

The attachment/detachment mechanism 110 includes a guide element 111 that guides the bottom covering 25 movably in the horizontal direction, for example, along a guide portion provided at the lower edge of the side covering 24, a coupling element 112 that couples the bottom covering 25 and the side covering 24 by hooking a hooking piece provided at an upper edge of the bottom covering 25 on a hooked portion provided at a lower edge portion of the side covering 24 when the bottom covering 25 is horizontally moved in a predetermined direction, and a positioning element 113 that positions the relative positional relationship between the side covering 24 and the bottom covering 25, for example, by a combination of a positioning pin and a positioning hole when the coupling element 112 couples the side covering 24 and the bottom covering 25.

According to the attachment/detachment mechanism 110 of this example, when the bottom covering 25 is detached, the bottom covering 25 may be moved along the lower edge of the side covering 24 in a direction J in which the coupling by the coupling element 112 is released while the positioning by the positioning element 113 is released, and the bottom covering 25 may be moved downward away from the side covering 24 at the time at which the coupling by the coupling element 112 is released. Also, when the bottom covering 25 is attached, a motion opposite to the detaching operation may be performed. Of course, the attachment/
detachment mechanism 110 is not limited to the aspect
illustrated in FIG. 6.

Figure 7A:
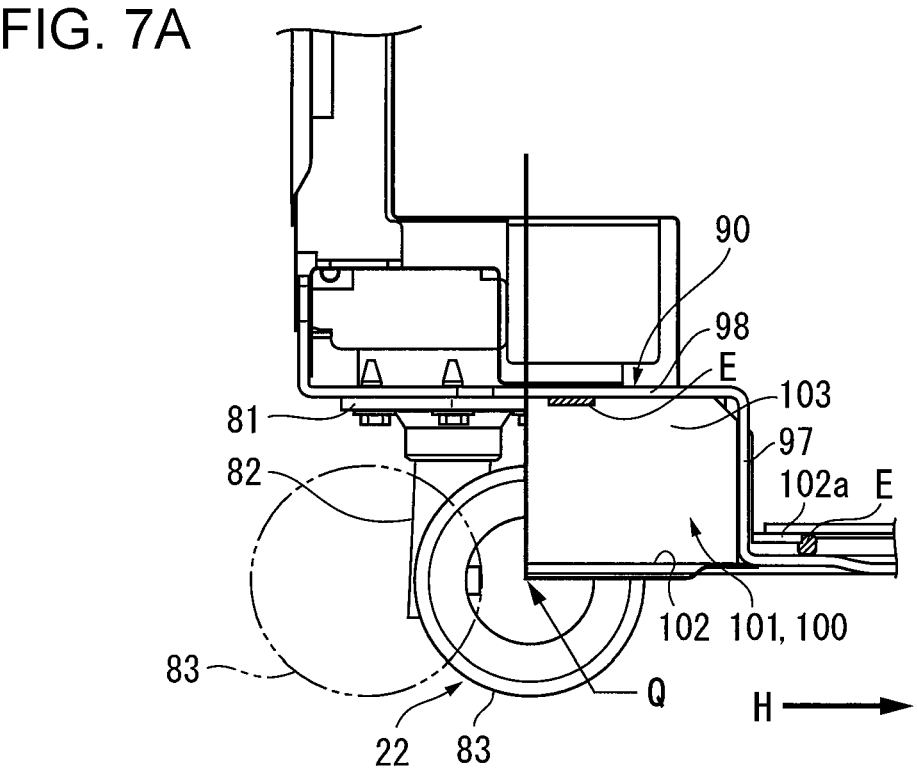
FIG. 7A is an explanatory view illustrating a relative positional relationship between a caster whose moving direction is fixed and a footstep portion in the image forming apparatus according to the first exemplary embodiment.

Positional Relationship between Footstep Portion and Caster (1) Caster Whose Moving Direction Changes In this example, as illustrated in FIG. 7A, an aspect is
provided in which the caster 22 moves in a certain direction.
In a case where the wheel holder 82 rotates about the support
shaft in a certain direction, if the support shaft is arranged so
as to deviate from the center position Q of the diameter of
the wheel 83, the center position Q of the diameter of the
wheel 83 may change in a range from a position indicated by
an imaginary line in FIG. 7A to a position indicated by a
solid line in FIG. 7A.

Thus, in this example, regardless of the position in the
moving direction of the wheel 83, it is necessary that the
footstep portion FT is arranged on the advancing direction H
side of the apparatus housing 21 with respect to the center
position Q of the diameter of the wheel 83 as a boundary.

In particular, in this example, when the center position Q
of the diameter of the wheel 83 is at the position indicated
by the solid line in FIG. 7A, the entrance position of the
footstep portion FT is selected so as to coincide with the
center position Q of the diameter of the wheel 83. Thus, in
this example, even when the moving direction of the wheel
83 is changed to another position, the entrance position of
the footstep portion FT is arranged on the advancing direc-
tion H side of the apparatus housing 21 with respect to the
center position Q of the diameter of the wheel 83.

(2) Caster Whose Moving Direction Is Fixed

Figure 7B:
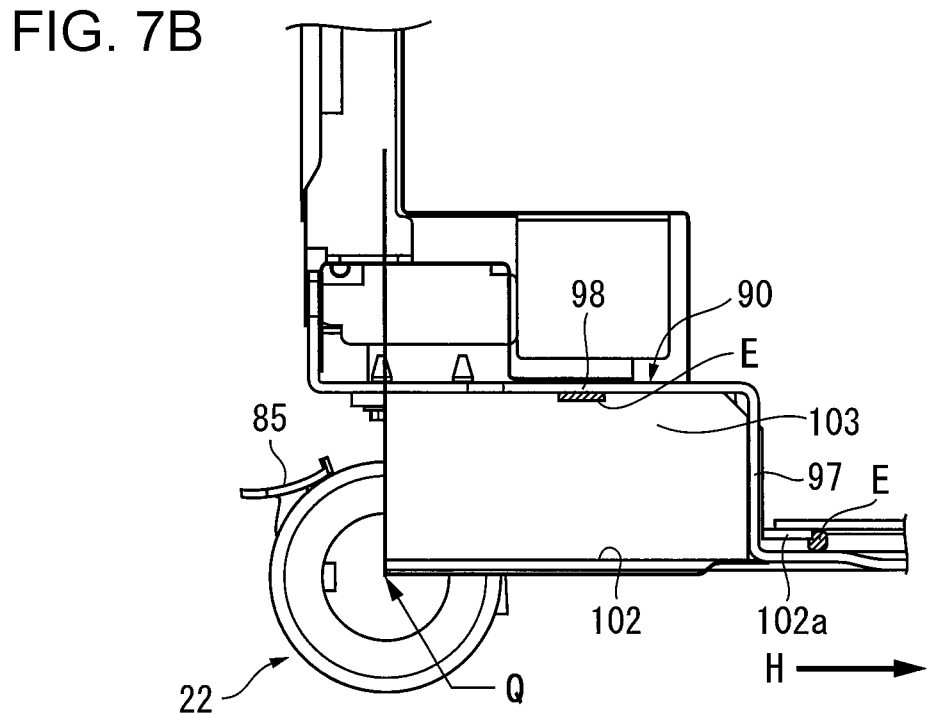
FIG. 7B is an explanatory view illustrating a relative positional relationship between a caster whose moving direction changes and the footstep portion in the image forming apparatus.

In a case of an aspect in which the moving direction of
each of the casters 22 located on both sides of the footstep
portion FT is fixed, as illustrated in FIG. 7B, since the wheel
holder 82 does not rotate around the support shaft, the center
position Q of the diameter of the wheel 83 is uniquely
determined and does not change. Thus, in this example, the
footstep portion FT may be arranged on the advancing
direction H side of the apparatus housing 21 with respect to
the center position Q of the diameter of the wheel 83 as a
boundary. In particular, the entrance position of the footstep
portion FT may be selected to coincide with the center
position Q of the diameter of the wheel 83.

Method of Using Footstep Portion

Now, when conveying the image forming apparatus 20, in
order to pass through an obstacle with a level difference that
is not able to be crossed by the casters 22, as illustrated in
FIGS. 3A and 3B, the bottom covering 25 covering the
footstep portion FT is removed to expose the footstep
portion FT.

Figure 8A:
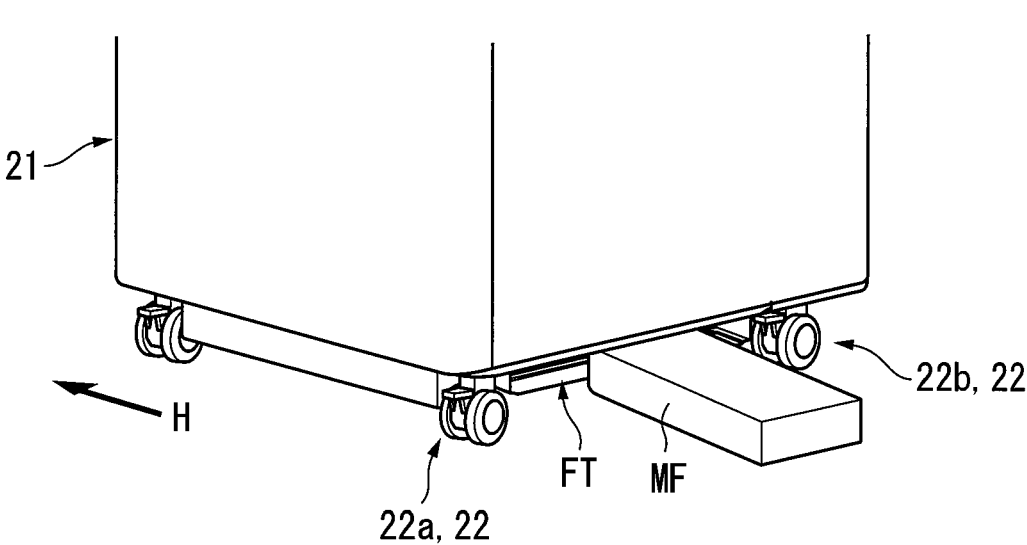
FIG. 8A is an explanatory view illustrating an example of use of the footstep portion when the image forming apparatus according to the first exemplary embodiment is conveyed.
Figure 8B:
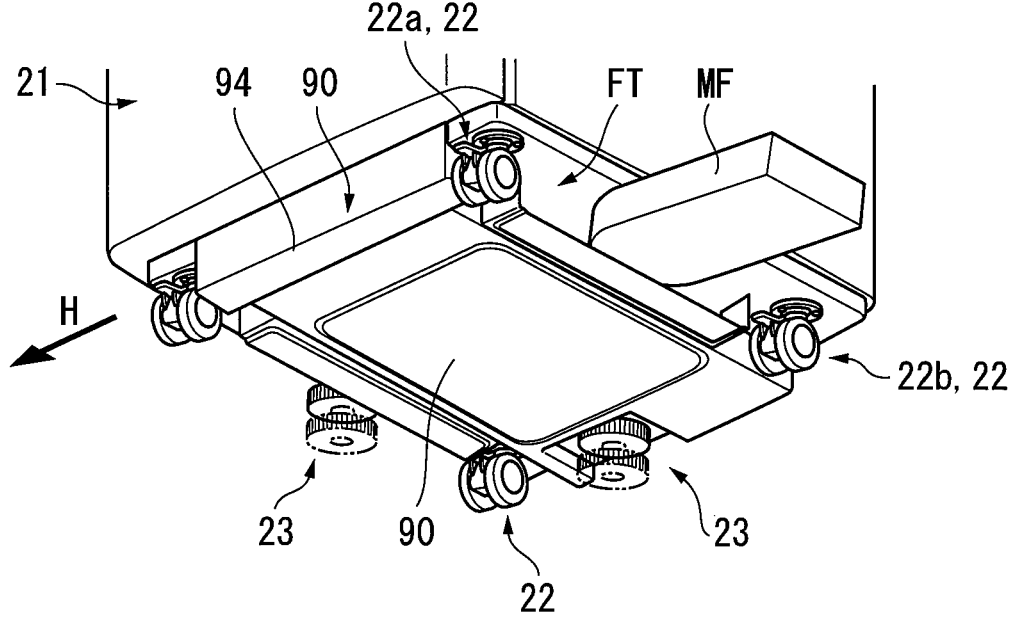
FIG. 8B is an arrow view when

Thereafter, as illustrated in FIGS. 2A, 8A, and 8B, the
operator may put a distal end portion of his/her foot MF on
the footstep portion FT in a manner that the distal end
portion of the foot MF is able to be hooked thereon while
gripping the vertical arm portion 71a of the support arm 71
provided on the top portion 21a of the apparatus housing 21,
tilt the image forming apparatus 20 with the ground contact
points of the wheels 83 of the casters 22 (specifically, 22a
and 22b) on both sides of the footstep portion FT as
fulcrums, and cross the obstacle.

Action of Footstep Portion

Figure 9A:
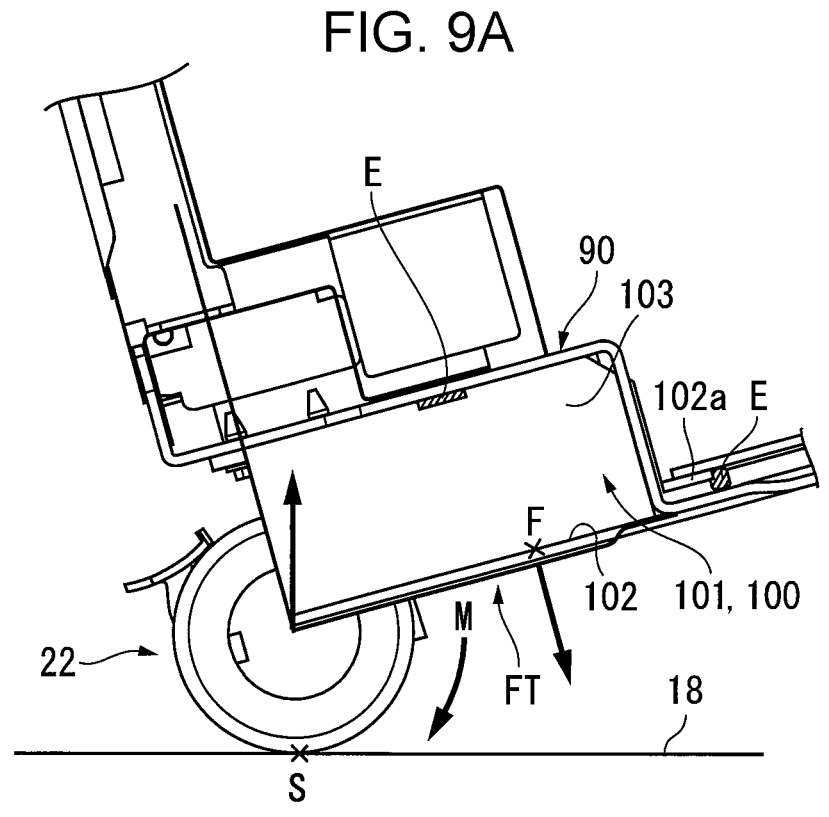
FIG. 9A is an explanatory view illustrating an action by the footstep portion used in the image forming apparatus according to the first exemplary embodiment.

In such a footstep portion FT, as illustrated in FIG. 9A,
when the apparatus housing 21 is tilted, the effort point F
upon the foot stepping on the footstep portion FT is forward
of the ground contact point (corresponding to the fulcrum S)
of the wheel 83 of the caster 22 with respect to the advancing
direction of the apparatus housing 21, so that the force
exerted on the effort point F generates a force of advancing the apparatus housing 21 in the advancing direction. How-
ever, a rotation moment M rotating in the direction opposite
to the advancing direction acts on the wheel 83, and the force
accompanying the foot stepping also acts on the fulcrum S
of the wheel 83 in a direction of pressing downward, so that
the rolling of the wheel 83 is suppressed. Thus, even when
the operator steps on the footstep portion FT and tilts the
image forming apparatus 20, there is little concern that the
apparatus housing 21 unnecessarily moves via the casters
22, and the image forming apparatus 20 may be kept in a
tilted posture and cross an obstacle having a level difference.

In particular, in this example, as long as an aspect is
provided in which the entrance position of the footstep
portion FT coincides with the center position Q of the
diameter of the wheel 83, the effort point F and the fulcrum
S of the footstep portion FT are on the same straight line, and
the rolling of the wheel 83 is further suppressed compared
to a case where the effort point F and the fulcrum S are not
arranged on the same straight line.

Also, in this example, as illustrated in FIGS. 4A to 5B, the
footstep portion FT is configured such that the ridges of the
footstep plate 101 at two positions (the projecting portion
102a of the step plate portion 102 and the upper end portion
of the side plate portion 103) are secured to the bottom frame
90 by welds E, and the ridge of the far side edge portion of
the side plate portion 103 of the footstep plate 101 is not
welded but arranged to abut against the partition wall 97 of
the bottom frame 90. As described above, since the footstep
portion FT has a structure in which the three axial directions
are fixed by the ridges at the three positions of the footstep
plate 101, the support strength of the footstep portion FT is
sufficiently kept.

In particular, in this example, since the recess 94 is
provided in the bottom plate 91 at the attachment position of
the footstep portion FT of the bottom frame 90 and the
protruding wall 98 is reinforced by the frame member 92
(see FIG. 12), the support rigidity of the bottom frame 90 at
the attachment position of the footstep portion FT is higher,
and the support strength of the footstep portion FT is more
stably kept by that amount.

Selection of Up-Down Width of Footstep Portion

Further, in this example, as illustrated in FIGS. 7A and
7B, the footstep portion FT is provided between the center
position Q of the diameter of the wheel 83 of the caster 22
and the lower surface of the protruding wall 98 of the bottom
frame 90.

At this time, in an aspect in which the footstep portion FT
is arranged so as to extend below the center position Q of the
diameter of the wheel 83, when the image forming apparatus
20 is conveyed, the distance between the footstep portion FT
and the ground contact surface of the wheel 83 becomes
small. Thus, the footstep portion FT is likely to collide with
an obstacle, and the traveling performance by the caster 22
is likely to be impaired.

In this regard, in this example, when the image forming
apparatus 20 is conveyed, since the distance between the
footstep portion FT and the ground contact surface of the
wheel 83 is ensured to some extent, the footstep portion FT
is less likely to collide with an obstacle, and the traveling
performance by the caster 22 is appropriately kept.

First Comparative Embodiment

Figure 9B:
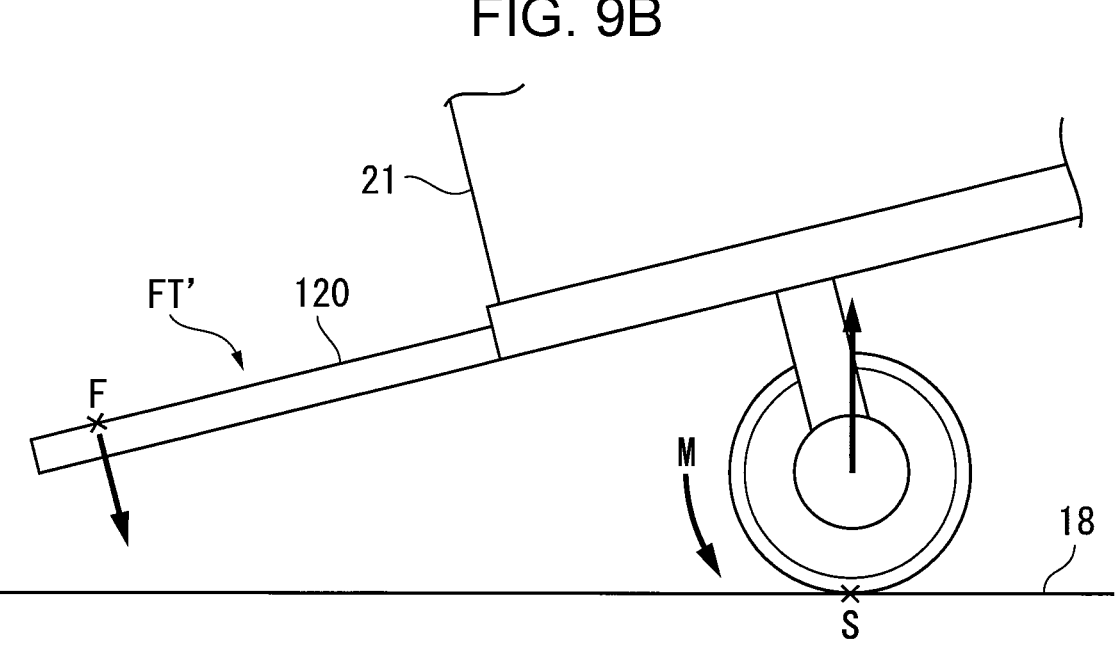
FIG. 9B is an explanatory view illustrating an action by a footstep portion used in an image forming apparatus according to a first comparative embodiment.

FIG. 9B illustrates a configuration example of a footstep
portion FT' according to a first comparative embodiment.

In the same drawing, the footstep portion FT' is config-
ured such that a footstep member 120 is arranged so as to protrude outward from the bottom portion 21*b* of the apparatus housing 21, and the effort point F of the foot stepping is located rearward of the fulcrum S of the wheel 83 of the caster 22 with respect to the advancing direction of the apparatus housing 21.

In this example, when the apparatus housing 21 is tilted, if the operator steps on the footstep member 120, a rotational moment M is applied to the wheel 83 in a direction in which the wheel 83 rotates in the advancing direction due to a force accompanying the foot stepping. Accordingly, the wheel 83 is likely to roll by that amount, and there is concern that it is difficult to stably tilt the apparatus housing 21.

Configuration Example of Support Part

Figure 10:
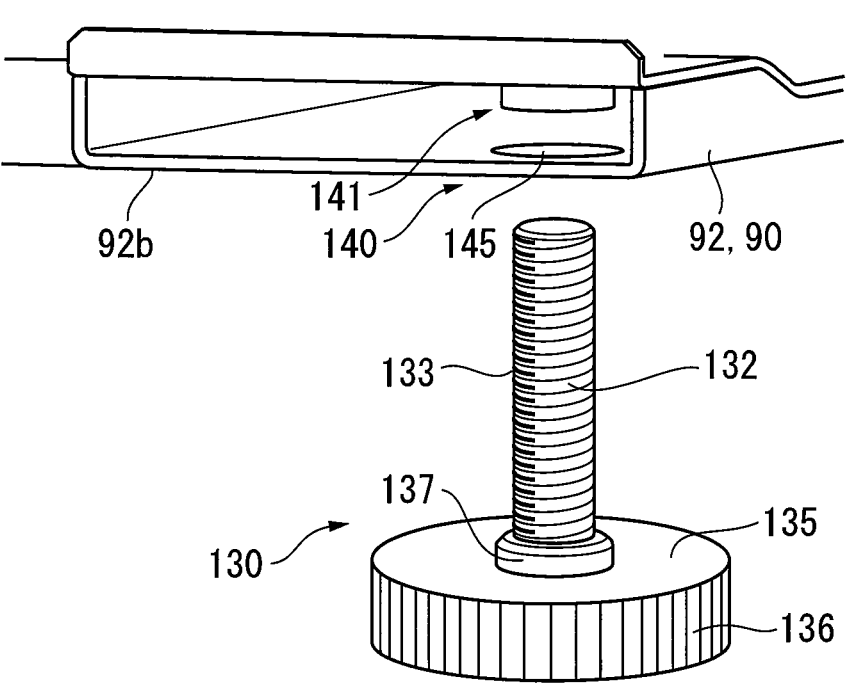
FIG. 10 is an explanatory view illustrating an example of an overturning-prevention support part used at the bottom portion of the housing structure of the image forming apparatus according to the first exemplary embodiment.
Figure 11:
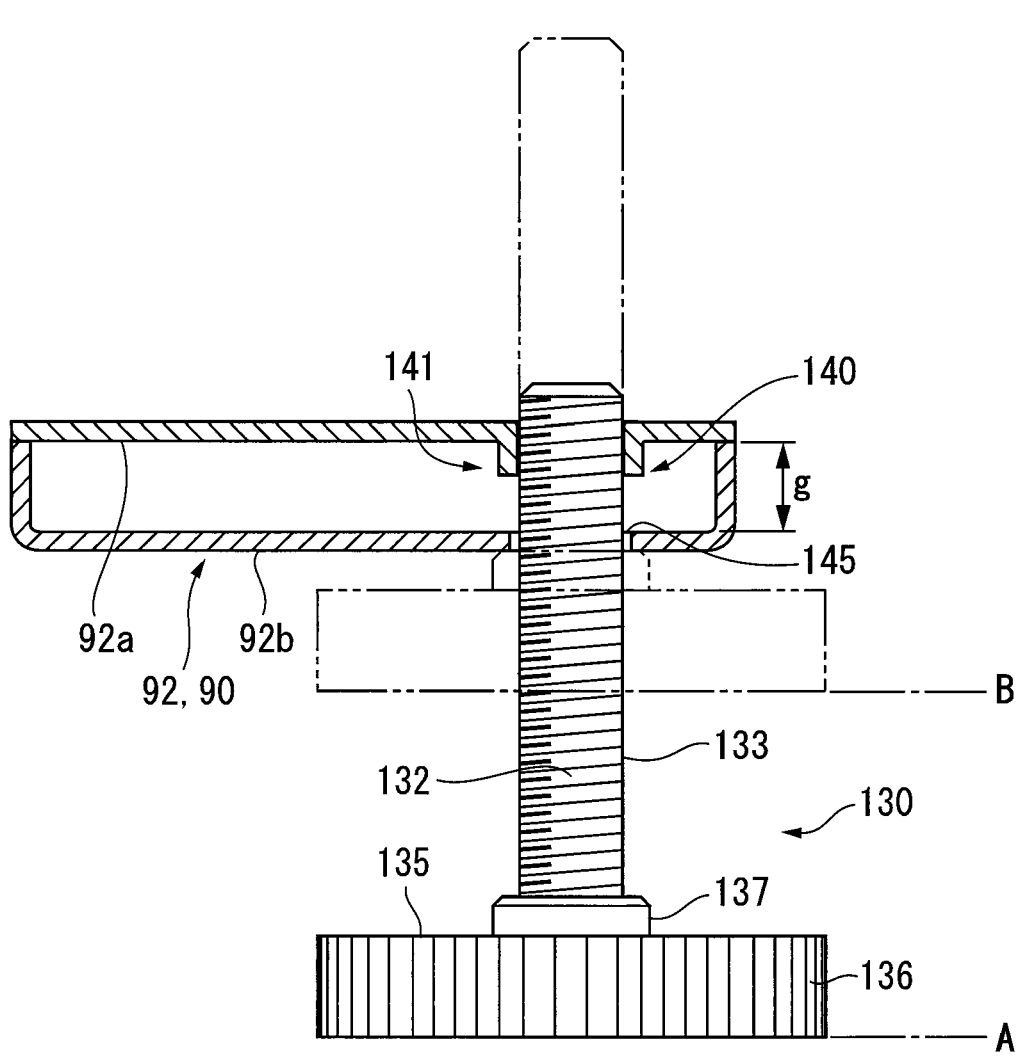
FIG. 11 is an explanatory view illustrating a method of using the support part illustrated in FIG. 10.

In this example, while the two support parts 23 are provided, as illustrated in FIGS. 10 and 11, the basic configuration of each of the support parts 23 includes an adjuster foot 130 as a height-adjustment leg part and a receiving part 140 that is provided on the bottom frame 90 and receives and supports the adjuster foot 130.

Here, in the adjuster foot 130, a male screw portion 133 is formed in substantially the entire region of a rod 132 extending in the height direction, and a pedestal portion 135 having an outer diameter larger than that of the male screw portion 133 of the rod 132 is provided at a lower end portion of the rod 132.

In this example, the material of the rod 132 may be appropriately selected as long as it is a metal having a high bending strength and having excellent screw workability, and, for example, a SUM (free cutting steel) material having more excellent screw workability than a steel material is used.

Also, the pedestal portion 135 is configured such that, for example, a disk-shaped pedestal body is formed by using a polycarbonate (PC) resin, an acrylonitrile butadiene styrene (ABS) resin or the like, a recess for accommodating the lower end portion of the rod 132 is formed at the center of the pedestal body, and the lower end portion of the rod 132 is inserted into the recess and secured by an adhesive or the like. Also, a non-slip uneven portion 136 for the time of rotation operation is formed on the outer peripheral portion of the pedestal portion 135, and a stepped portion 137 is formed around the recess of the pedestal portion 135, so that the coupling strength between the recess of the pedestal portion 135 and the lower end portion of the rod 132 is ensured by increasing the coupling portion area therebetween.

In this example, although the stepped portion 137 is formed on the pedestal portion 135, the stepped portion 137 does not have to be provided and may be appropriately selected.

Also, the receiving part 140 includes a burred portion 141 provided in an upper plate member 92*a* of the frame member (specifically, the left frame member or the rear frame member) 92 that is a component of the bottom frame 90 and into which the male screw portion 133 of the rod 132 is screwed, and a through hole 145 provided in a lower plate member 92*b* of the frame member 92 and through which the rod 132 may pass.

Also, in this example, a distance g in the up-down direction between the burred portion 141 and the through hole 145 is selected such that the rod 132 is kept inserted through the burred portion 141 and the through hole 145 in a state where the adjuster foot 130 is lowered to the ground contact position (when the height adjustment is performed).

Here, when the adjuster foot 130 receives a load at the time of overturning of the image forming apparatus 20, the rod 132 of the adjuster foot 130 is to be elastically deformed, and in this case, the hole diameter of the through hole 145 may be selected so as to fall within an elastic deformation range of the rod 132.

Also, the through hole 145 may be formed with a tolerance equal to or larger than the tolerance of the hole diameter of the burred portion 141.

Method of Using Support Part

During Height Adjustment

In installing the image forming apparatus 20, as illustrated in FIGS. 10 and 11, when the pedestal portion 135 of the adjuster foot 130 is rotated, the male screw portion 133 of the rod 132 of the adjuster foot 130 moves in the ground contact direction along the female screw portion of the burred portion 141, so that the adjuster foot 130 retracted to a retracted position B may be drawn downward to a ground contact position A indicated by a solid line, for example, as indicated by a two-dot chain line in FIG. 11.

When the adjuster foot 130 has reached the ground contact position A, the adjuster foot 130 keeps a state in which the rod 132 is inserted through the burred portion 141 and the through hole 145 that are the receiving part 140.

During Retraction

In installing the image forming apparatus 20, when the image forming apparatus 20 is moved by the caster 22 and a place to be installed is selected, the adjuster foot 130 may be held at the retracted position B indicated by a two-dot chain line in FIG. 11 so that the support part 23 does not interfere with the moving operation of the image forming apparatus 20.

In this example, when the adjuster foot 130 is located at the retracted position B, the pedestal portion 135 and the stepped portion 137 of the adjuster foot 130 are arranged at a position not passing through the through hole 145, and the rod 132 of the adjuster foot 130 passes through the through hole 145 and the burred portion 141 and further arranged to penetrate through the upper plate member 92*a* of the frame member 92.

In this example, although the burred portion 141 is employed as the receiving part 140, of course, a nut member may be used instead of the burring portion 141.

Caster Protective Structure

Figure 12:
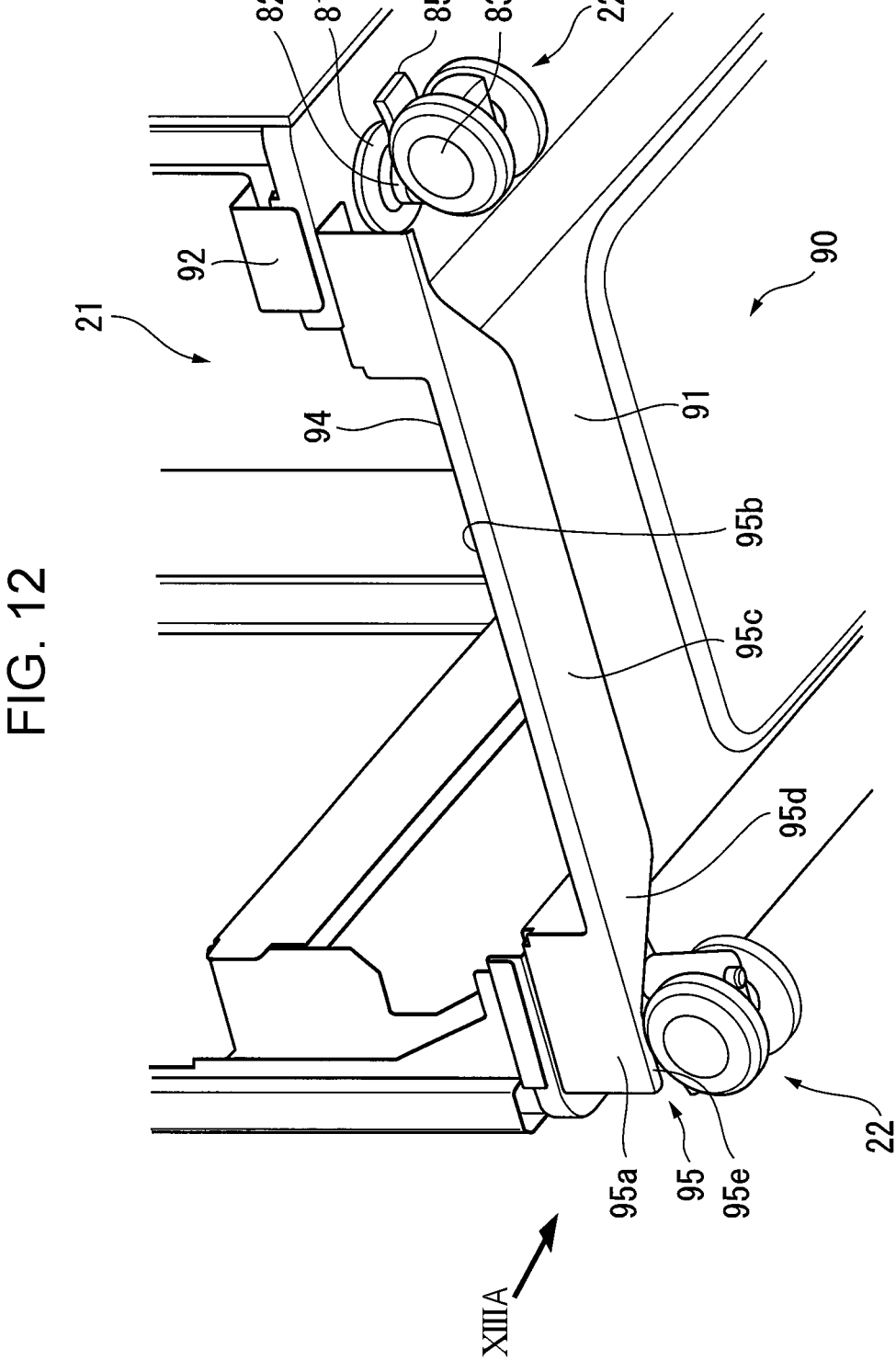
FIG. 12 is an arrow view seen in a direction XII in FIG. 3B.
Figure 13A:
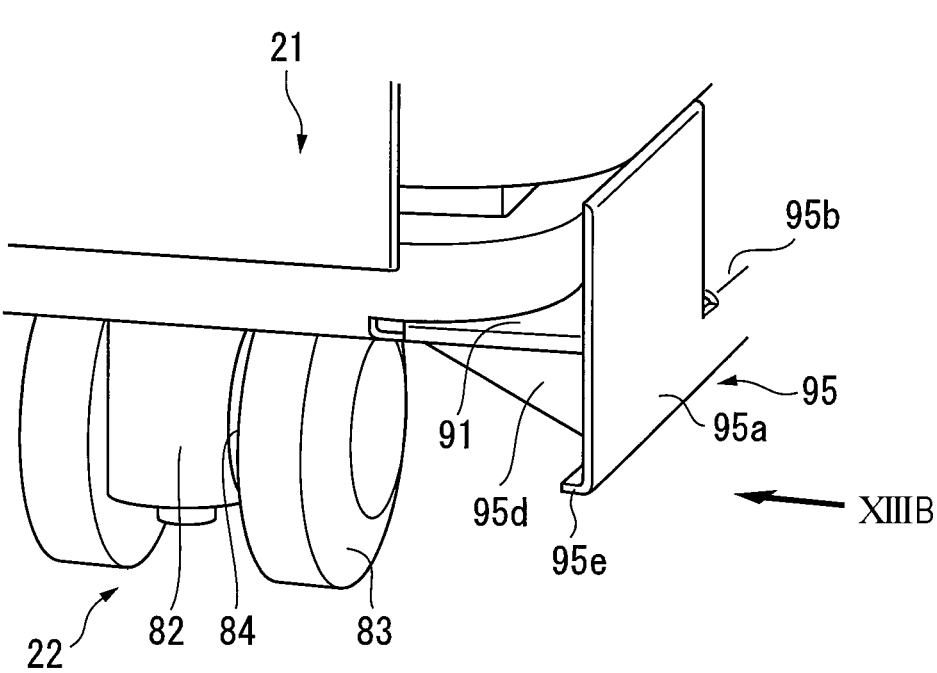
FIG. 13A is an explanatory view illustrating the detail of a portion XIIIA in FIG. 12.
Figure 13B:
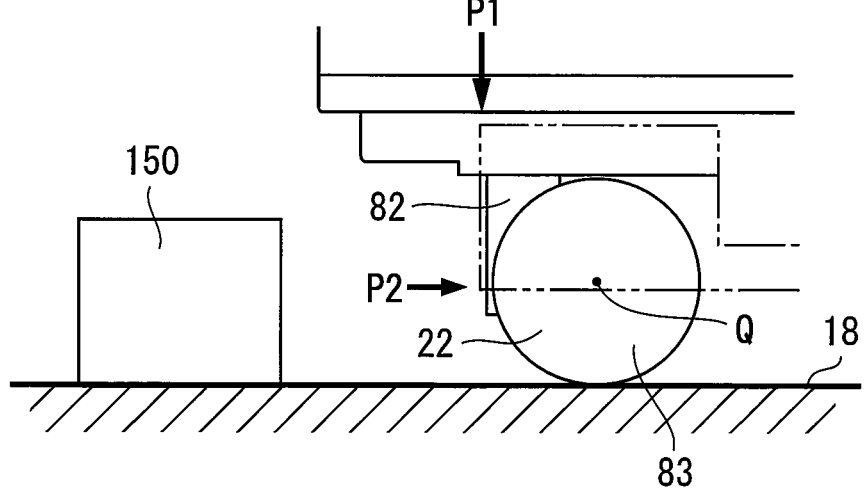
FIG. 13B is an arrow view seen in a direction XIIIB in FIG. 13A.

In the present exemplary embodiment, in order to prevent the casters 22 from being damaged when the casters 22 collide with an obstacle in conveying the image forming apparatus 20, as illustrated in FIGS. 12 to 13B, a structure is employed in which the casters 22 are protected by using the frame member constituting the bottom frame 90 of the apparatus housing 21, specifically, the front frame member 95.

That is, in this example, the front frame member 95 constituting the bottom frame 90 of the apparatus housing 21 functions as a protective part for protecting the casters 22.

In this example, the front frame member 95 has a basic configuration in which a long rectangular flat plate portion 95*a* extending in the left-right direction is provided, a U-shaped cutout 95*b* surrounding the recess 94 of the bottom plate 91 constituting the bottom frame 90 is formed on the upper edge side of the flat plate portion 95*a*, a substantially L-shaped first bent piece 95*c* bent at an angle smaller than 90° with respect to the flat plate portion 95*a* is formed on the lower edge side of the flat plate portion 95*a* in a range corresponding to the region of the recess 94 of the bottom plate 91, a second bent piece 95*d* is formed at a position on the lower edge side of the flat plate portion 95*a* other than the region of the recess 94 of the bottom plate 91 to gradually decrease in bent amount from a portion adjacent to the first bent piece 95c and extends in a substantially triangular shape, and a substantially L-shaped third bent piece 95e bent to have a small bent amount substantially equal to the minimum bent amount of the second bent piece 95d is formed adjacent to the second bent piece 95d.

In the front frame member 95, the flat plate portion 95a is welded to the front edge portion of the recess 94 of the bottom plate 91, and the distal end edge of the first bent piece 95c is welded to the outer surface of the bottom portion of the recess 94 of the bottom plate 91.

(1) As illustrated in FIGS. 13A and 13B, a longitudinal-end-portion position P1 of the front frame member 95 is arranged in a region at or outside an outer-end-portion position of the caster 22.

Here, the outer-end-portion position of the caster 22 basically refers to the position of any one of the components (as major components, the wheel holder 82 and the wheel 83) of the caster 22 arranged at an outermost end portion. However, in the case of the stopper 85 that is a component, since the stopper 85 is originally a movable element, even though the stopper 85 exists at the outer-end-portion position of the caster 22 at the time of release, the stopper 85 is excluded as long as the position at the time of restraint does not become the outer-end-portion position of the caster 22.

♦ Condition 1: A case where the longitudinal-end-portion position P1 of the front frame member 95 is arranged at the same position as the outer-end-portion position of the caster 22.

Under this condition, when the caster 22 collides with an obstacle 150, the distal end portion of the front frame member 95, specifically, the distal end portion of the flat plate portion 95a collides with the obstacle 150 simultaneously with the caster 22. Accordingly, since the impact force due to the collision is dispersed to the caster 22 and the front frame member 95, the impact force to the caster 22 is reduced by that amount, and the deformation of the caster 22 is suppressed.

Under this condition, although the portion of the front frame member 95 that collides with the obstacle 150 is the flat plate portion 95a, since the impact force at the time of collision with the obstacle 150 is received in the longitudinal direction, the rigidity of the front frame member 95 is higher than that of the caster 22, and the impact force acting on the caster 22 may be reduced.

♦ Condition 2: A case where the longitudinal-end-portion position P1 of the front frame member 95 is arranged outward with respect to the outer-end-portion position of the caster 22.

Under this condition, in a situation where the caster 22 collides with the obstacle 150, the distal end portion of the front frame member 95, specifically, the distal end portion of the flat plate portion 95a collides with the obstacle 150 first. Thus, in this example, a situation in which the caster 22 collides with the obstacle 150 may be avoided.

Under this condition, even when the conveying direction of the image forming apparatus 20 is tilted with respect to the longitudinal direction of the front frame member or there is an assembly tolerance in the apparatus housing 21 or the caster 22, a situation in which only the caster 22 collides with the obstacle 150 may be avoided, and the front frame member 95 may collide with the obstacle before the collision of the caster 22.

(2) The longitudinal end portions of the front frame member 95 each are arranged with a gap so as not to come into contact with the caster 22 when the caster 22 rotates in a certain direction.

In this example, the relative positional relationship between the flat plate portion of the front frame member 95 and the caster 22 has a distance such that the flat plate portion 95a and the caster 22 are kept out of contact with each other, and in the front frame member 95, the second bent piece 95d and the third bent piece 95e are arranged close to the caster 22, but the bent amounts of the second bent piece 95d and the third bent piece are sufficiently smaller than that of the first bent piece 95c.

Thus, there is no concern that the front frame member 95 and the caster 22 interfere with each other.

(3) A lower end position P2 of the longitudinal end portion of the front frame member 95 is arranged in a lower region at or below the center position Q of the caster 22 (specifically, corresponding to the center position of the axle 84 of the wheel 83).

Compared with a case where the lower end position P2 of the longitudinal end portion of the front frame member 95 is arranged above the center position Q of the caster 22, the caster 22 may be effectively protected without being a hindrance to cross the obstacle 150.

In particular, if the lower end position P2 of the longitudinal end portion of the front frame member 95 is arranged below the center position Q of the caster 22, it is further effective in protecting the caster 22.

(4) The front frame member 95 has the U-shaped cutout 95b surrounding the recess 94 of the bottom plate 91, and keeps the rigidity of the front edge of the bottom plate 91.

In this example, the recess 94 is provided in advance in the bottom plate 91, and the bottom plate 91 is configured to ensure the rigidity of the periphery by the front frame member 95 together with the left and right frame members and the rear frame member (not illustrated).

Thus, the recess 94 of the bottom plate 91 may be effectively used as, for example, a housing portion of a lowermost medium feed portion (not illustrated) of the medium feed device 40.

(5) The front frame member 95 is arranged closer to the near side than the caster 22 on the near side.

In this example, the front frame member 95 suppresses damage due to collision of the caster 22 with the obstacle 150 on the longitudinal end portion side, and may prevent a situation in which, for example, when a user performs operation, the user's toes touch the caster 22 by concealing the caster 22 from the front side by the flat plate portion 95a.

(6) The front frame member 95 has a structure that protects the casters 22 located on both sides with longitudinal both end portions thereof.

This example is effective in protecting plural casters 22 with one front frame member 95.

(7) The front frame member 95 has a structure including not only the flat plate portion 95a but also the first to third bent pieces 95c to 95e, and the rigidity of the front edge of the bottom plate 91 is increased compared to a structure including only the flat plate portion 95a.

That is, the flat plate portion 95a is secured to the front edge of the bottom plate 91, and the first bent piece 95c is secured to the lower surface of the bottom portion of the recess 94 of the bottom plate 91, so that a closed cross-sectional structure is formed with the bottom plate 91 on the near side of the bottom plate 91. Thus, the support rigidity on the near side of the bottom plate 91 may be increased.

Further, in this example, since the longitudinal end portion of the front frame member 95 has the L-shaped cross section defined by the flat plate portion 95a and the third bent piece 95e, the rigidity is increased as compared with a case where the third bent piece 95e is not provided, and the impact against the obstacle 150 may be received without deformation by that amount.

Second Exemplary Embodiment

Figure 14:
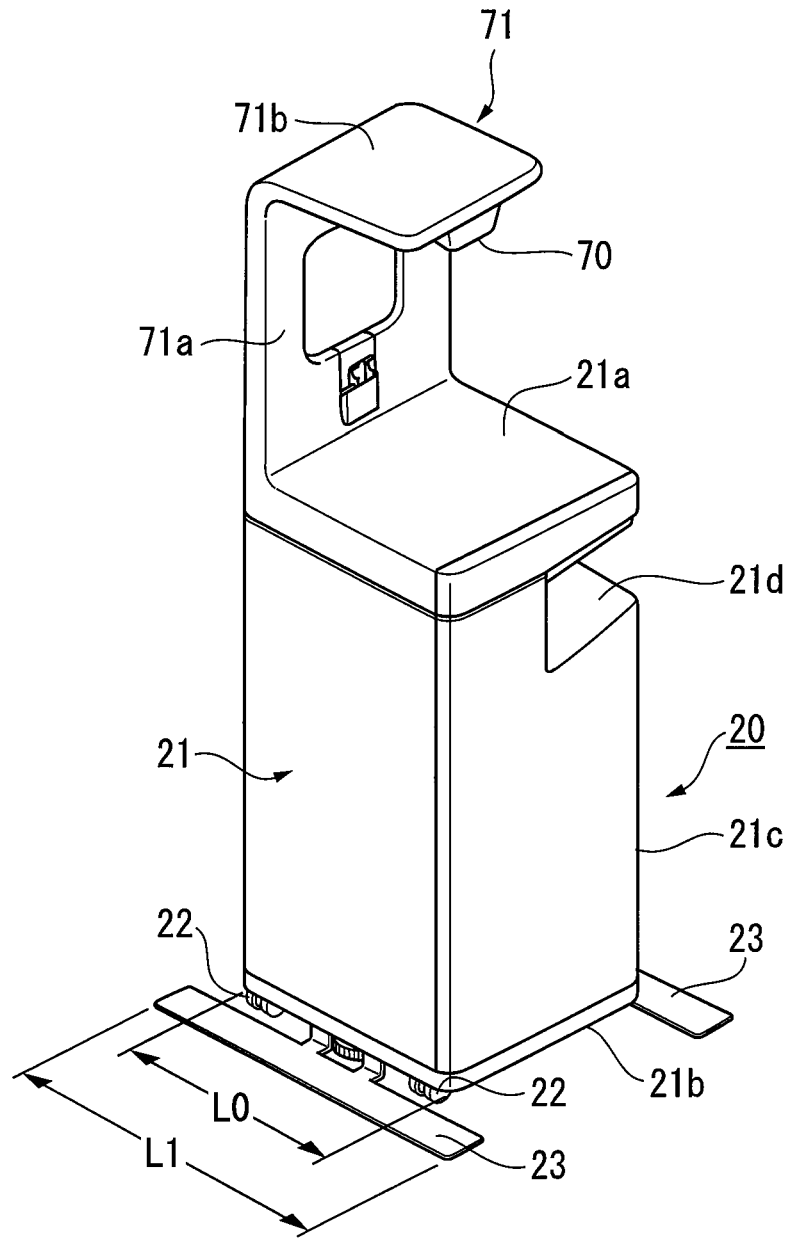
FIG. 14 is an explanatory view illustrating an appearance of an image forming apparatus as an object according to a second exemplary embodiment.

FIG. 14 illustrates a major part of an image forming apparatus according to a second exemplary embodiment.
Overall Configuration of Image Forming Apparatus In this example, the basic configuration of the image forming apparatus 20 includes an apparatus housing 21 and various elements mounted in the apparatus housing 21 for forming an image in substantially the same manner as in the first exemplary embodiment, but the bottom support structure of the apparatus housing 21 is different from that in the first exemplary embodiment.

Figures 15A, 15B:
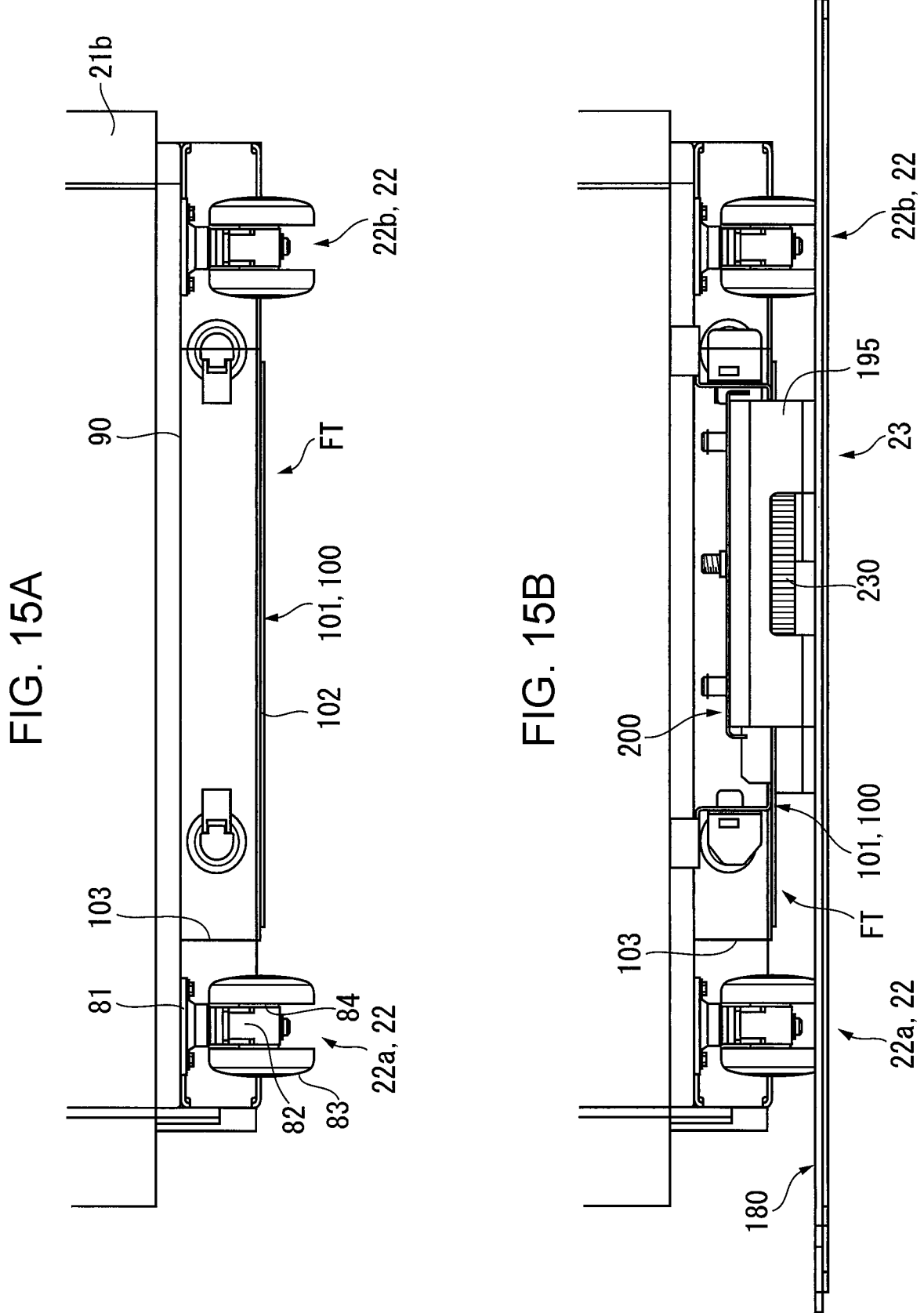
FIG. 15A is an explanatory view illustrating a vicinity of a footstep portion in a housing structure at a bottom portion of the image forming apparatus according to the second exemplary embodiment.
FIG. 15B is an explanatory view illustrating a state in which an overturning-prevention support part is attached to the footstep portion illustrated in FIG. 15A.
Figure 16:
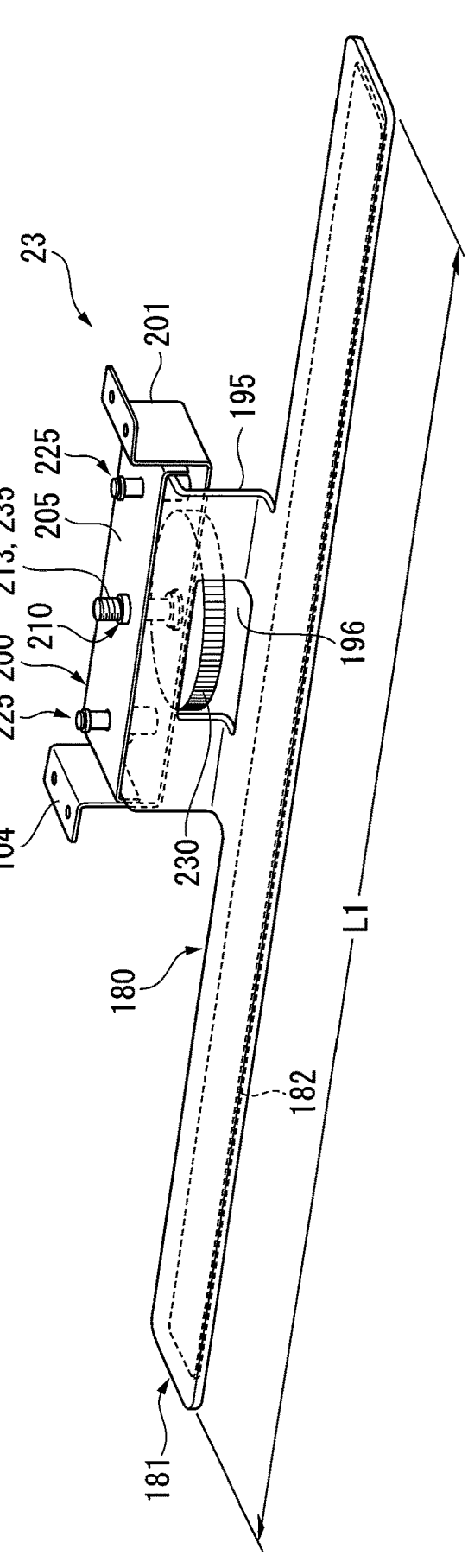
FIG. 16 is an explanatory view illustrating an overall configuration of the support part used in the second exemplary embodiment.

That is, in this example, the bottom support structure of the apparatus housing 21 includes casters 22 provided at plural positions (four corners in this example) on the lower surface of the bottom portion of the apparatus housing 21 and serving as movable supporters that convey the apparatus housing 21 in a certain direction, and support parts 23 that stably support the apparatus housing 21 when the image forming apparatus 20 is installed. As illustrated in FIGS. 15A and 15B, the support parts 23 are attached using the footstep portion FT according to the first exemplary embodiment.
Overall Configuration of Support Part In this example, the position of the center of gravity of the image forming apparatus 20 is located substantially at the center of the apparatus housing 21 in plan view, and the support parts 23 are symmetrically provided in a lower portion on a lateral side (corresponding to a side) adjacent to a near side (corresponding to a front side) of the apparatus housing 21 as illustrated in FIGS. 14 to 16.

Also, in this example, a pair of footstep portions FT are provided by symmetrically assembling footstep parts 100 in lower portions in the left-right direction of the bottom frame 90.

Figure 17:
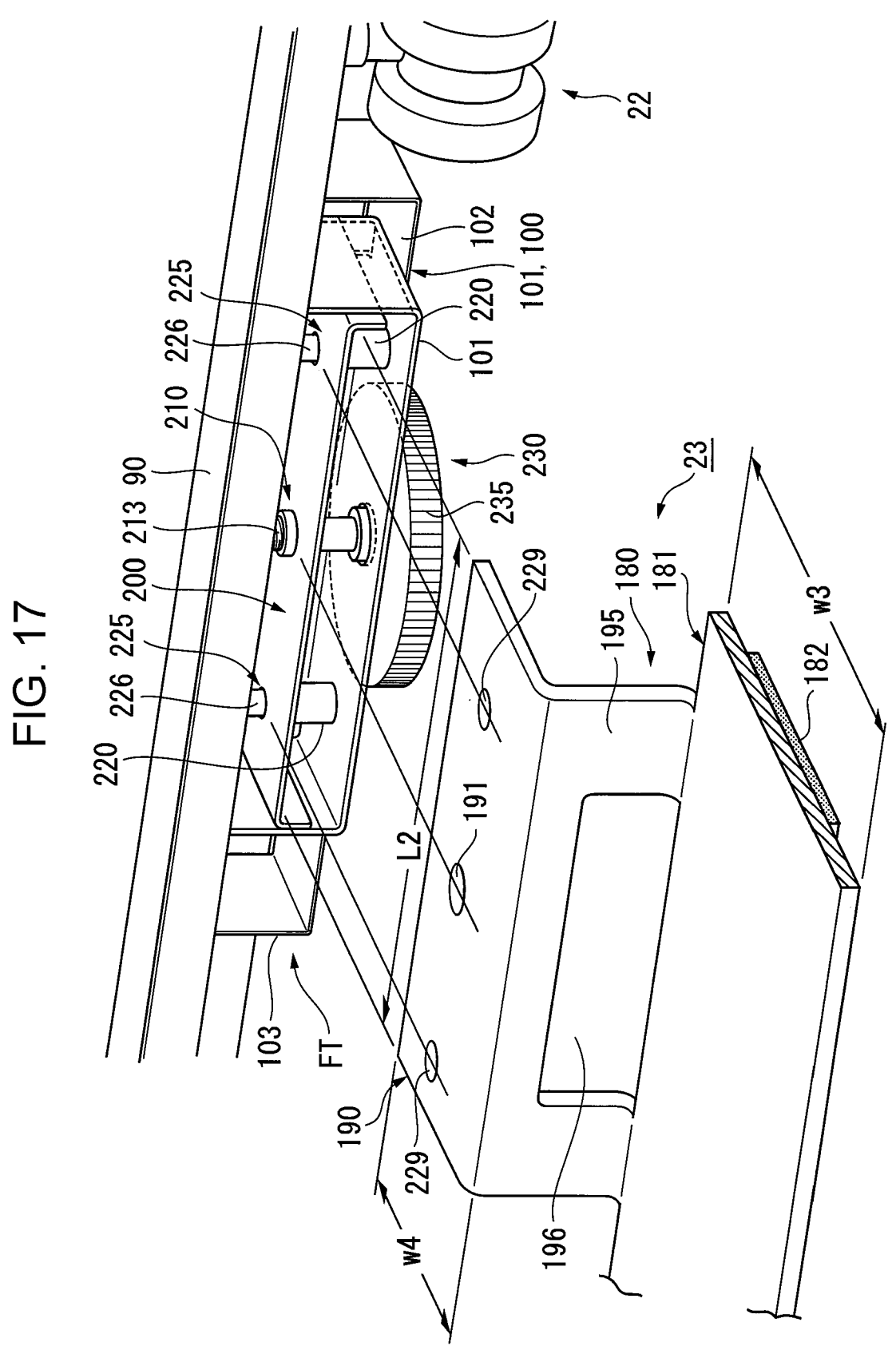
FIG. 17 is an explanatory view illustrating details around an elevating/lowering operation portion of the support part illustrated in FIG. 16.

The basic configuration of each of the support parts 23 includes a leg part 180 that comes into contact with the installation surface 18 and supports the apparatus housing 21, an elevating/lowering mechanism 200 that is provided in a lower portion of the apparatus housing 21 and serves as an elevating/lowering unit that elevates or lowers the leg part 180, and an operation handle 230 serving as an operation unit that operates an elevating/lowering motion of the elevating/lowering mechanism 200.
Leg Part In this example, as illustrated in FIGS. 16 and 17, the leg part 180 includes an outer leg portion 181 provided so as to come into contact with the installation surface 18 and extending to protrude outward from the outer side surface of the apparatus housing 21 from the gap between the lower portion of the apparatus housing 21 and the installation surface 18, an inner leg portion 190 arranged above the outer leg portion 181 and extending inward from the outer side surface of the apparatus housing 21, and a coupling portion 195 coupling the outer leg portion 181 and the inner leg portion 190 inside the outer side surface of the apparatus housing 21.

In this example, the leg part 180 is formed by bending a single metal plate member to form the outer leg portion 181, the inner leg portion 190, and the coupling portion 195.

Here, a metal plate member used as the leg part 180 may be appropriately selected as long as it has rigidity necessary for supporting the image forming apparatus 20, but in this example, a thickness t1 (see FIG. 19B) of the leg part 180 is selected to be larger than the thickness of a frame member constituting a framework of the apparatus housing 21. Generally, a plate member of such as SUS or the like which is not thicker than 2 mm is used as the frame member in many cases, but in this example, a metal plate member which is thicker than the frame member, for example, a metal plate member with a thickness of 4 mm is used as the leg part 180.
Outer Leg Portion In this example, as illustrated in FIGS. 14, and 16 to 18, the outer leg portion 181 is formed of a long rectangular plate member extending in a direction along the outer side surface on the lateral side (side) of the apparatus housing 21, and a length dimension L1 thereof is larger than that of the inner leg portions 190 and equal to or larger than a length dimension L0 (in this example, larger than L0) in the horizontal direction of the outer side surface on the lateral side of the apparatus housing 21.

Also, a width dimension w3 of the outer leg portion 181 protruding outward from the outer side surface on the lateral side of the apparatus housing 21 is selected in consideration of the installation surface area including the leg part 180 with respect to the height of the apparatus housing 21 and in consideration of the relationship with the length dimension L1 of the outer leg portion 181.

Figure 18:
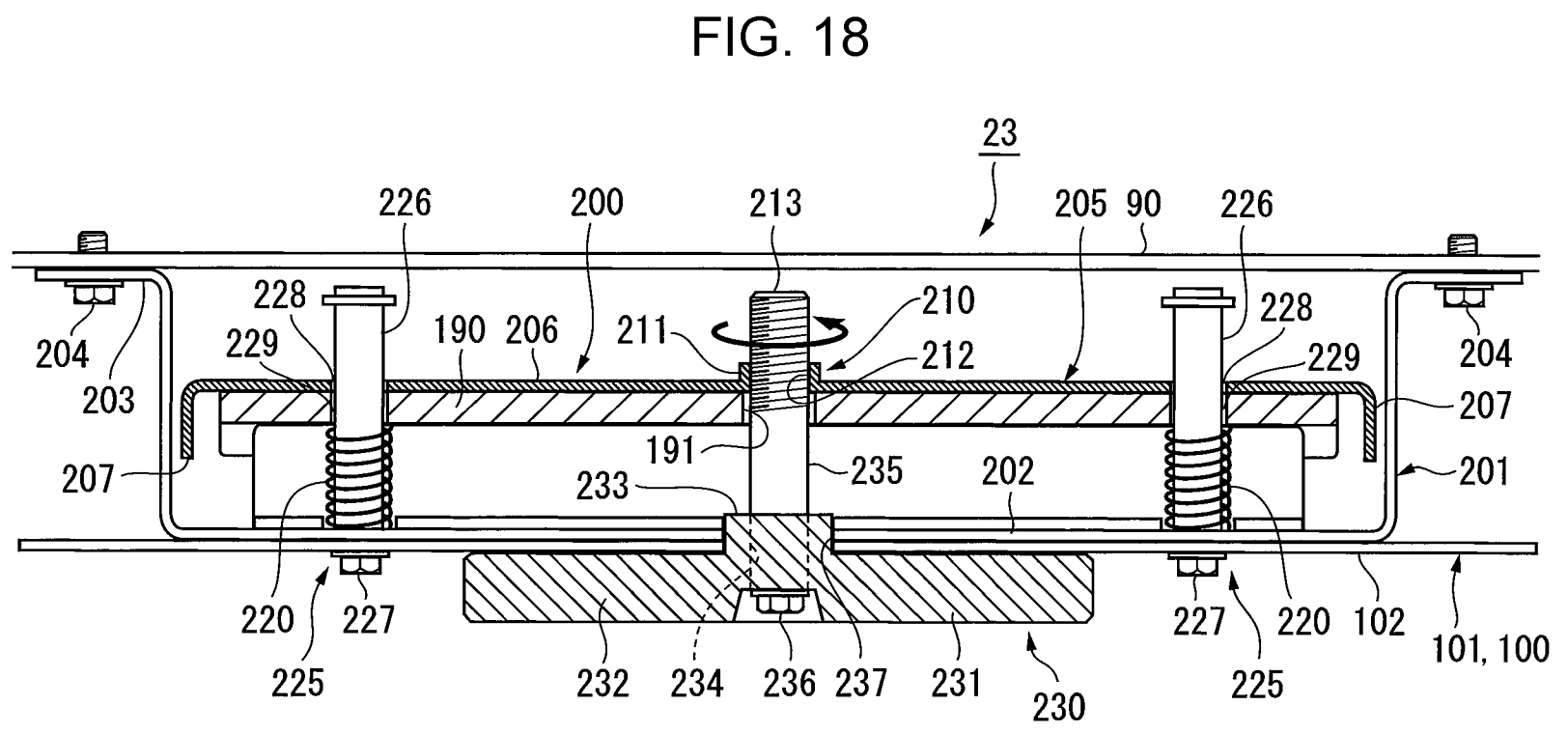

Further, in order to prevent the leg part 180 from damaging the installation surface 18, a long rectangular elastic member 182 is attached to the back surface of the outer leg portion 181 so as not to protrude from the peripheral edge of the outer leg portion 181. Here, as the elastic member 182, although depending on the weight of the image forming apparatus 20, if it is assumed that the weight is large to some extent, an elastic rubber having a high hardness (for example, PORON rubber) is used. Also, if the elastic member 182 is too thick, there is concern that the outer leg portion 181 may obstruct passage, and hence, the thickness of the elastic member 182 of about 2 mm may be selected.
Inner Leg Portion In this example, as illustrated in FIGS. 17 and 18, the inner leg portion 190 is formed of a rectangular plate member extending in a direction along the outer side surface on the lateral side (side) of the apparatus housing 21, has a length dimension L2 of about ⅓ of the length dimension L0 in the horizontal direction of the outer side surface on the lateral side of the apparatus housing 21, and is arranged near the center in the front-rear direction of the outer side surface on the lateral side of the apparatus housing 21. In this example, a width dimension w4 of the inner leg portion 190 extending inward from the outer side surface on the lateral side of the apparatus housing 21 may be selected as appropriate, but is slightly shorter than a width dimension w3 of the outer leg portion 181 in this example.

Here, since a load applied to the image forming apparatus 20 is transmitted from the inner leg portion 190 to the leg part 180 in the inner leg portion 190, if the size of the inner leg portion 190 is too small, a large load stress acts on the inner leg portion 190 and the coupling portion 195, and it is necessary to sufficiently ensure the rigidity of the inner leg portion 190 and the coupling portion 195 by that amount. In contrast, if the size of the inner leg portion 190 is appropriately selected in consideration of the arrangement of the surrounding parts, the load stress acting on the inner leg portion 190 and the coupling portion 195 may be reduced, and the strength design of the inner leg portion 190 and the coupling portion 195 may be facilitated by that amount.

Coupling Portion

In this example, the coupling portion 195 is formed of a rectangular plate member extending substantially in the vertical direction and has a length dimension similar to the length dimension L2 of the inner leg portion 190, and the dimensions in the up-down direction of the outer leg portion 181 and the inner leg portion 190 may be set to values larger than the sum of the thickness of the operation handle 230 and the amount of upward retraction of the leg part 180 during conveyance of the image forming apparatus 20.

In this example, the coupling portion 195 is coupled to the outer leg portion 181 and the inner leg portion 190 by curved bent portions at boundary portions with respect to the outer leg portion 181 and the inner leg portion 190.

Also, in the coupling portion 195, a rectangular opening 196 through which a part of the operation handle 230 is exposed is formed, so that the leg part 180 and the operation handle 230 do not interfere with each other during an elevating/lowering motion of the leg part 180.

Attached Portion Structure of Elevating/Lowering Mechanism and Operation Handle

In this example, the elevating/lowering mechanism 200 and the operation handle 230 are assembled on the lower side of the bottom frame 90 constituting the bottom portion 21*b* of the apparatus housing 21. On the lower surface of the bottom frame 90, both end flange portions of a fixing bracket 201 having a substantially hat-shaped cross section are fixed via fasteners 204 such as screws in a direction (corresponding to the front-rear direction of the apparatus housing 21) along the outer side surface on the lateral side of the apparatus housing 21, and the fixing bracket 201 is used for assembling the elevating/lowering mechanism 200 and the operation handle 230.

Here, the fixing bracket 201 is formed in a size capable of accommodating the inner leg portion 190 of the leg part 180 in a non-contact state in an inner region thereof, and bent flanges 203 rising upward are formed on both side edges in the left-right direction intersecting with the front-rear direction of the apparatus housing 21 in the rectangular bottom wall 202 to increase the surface rigidity of the bottom wall 202 of the fixing bracket 201.

In this example, the footstep plate 101, which is the footstep part 100 having a wide channel shape in cross section, is fixed to the lower surface of the bottom frame 90 by welding so as to surround the fixing bracket 201, and the outer surface of the bottom wall 202 of the fixing bracket 201 is arranged in contact with the inner surface of the step plate portion 102 of the footstep plate 101.

Operation Handle

As illustrated in FIGS. 16 to 18, the operation handle 230 includes a disc-shaped handle body 231 integrally formed of, for example, a PC resin or an ABS resin, a non-slip uneven portion 232 for the time of rotation operation is formed on the outer peripheral portion of the handle body 231, a cylindrical stepped portion 233 is formed at the center of one side surface of the handle body 231 to project in the thickness direction of the handle body 231, a bottomed pin insertion hole 234 is formed on the stepped portion 233 side at the center of the handle body 231 to accommodate one end of a metal shaft pin 235 serving as a rotation center shaft, the shaft pin 235 is inserted into the pin insertion hole 234, and the end portion of the shaft pin 235 is fixed to the bottom portion of the pin insertion hole 234 by a fastener 236 on the back side of the handle body 231. A male screw portion 213 is formed in a region near the distal end of the shaft pin 235.

In this example, a holding hole 237 into which the stepped portion 233 of the operation handle 230 may be inserted is formed in the fixing bracket 201 and the step plate portion 102 of the footstep plate 101, and the operation handle 230 is held so that the handle body 231 is rotatable at a fixed position on the lower surface of the footstep plate 101 by rotatably holding the stepped portion 233 in the holding hole 237 of the fixing bracket 201, arranging the shaft pin 235 in the fixing bracket 201, and engaging the shaft pin 235 with the elevating/lowering mechanism 200 as described later.

In this state, the handle body 231 of the operation handle 230 is arranged so as to be exposed to the outside of the apparatus housing 21 from the opening 196 opened in the coupling portion 195 of the leg part 180. Here, a projection amount m (see FIG. 19B) of the handle body 231 from the outer side surface of the coupling portion 195 may be appropriately selected in a range of about 5 to 10 mm (about 7 mm in the drawing) as long as the rotation operability with respect to the operation handle 230 is appropriately kept.

Elevating/Lowering Mechanism

In this example, as illustrated in FIGS. 16 to 18, the elevating/lowering mechanism 200 includes an elevating/lowering plate 205 as an elevating/lowering element that moves up and down in conjunction with the operation of the operation handle 230, and elevates or lowers the inner leg portion 190 following the elevating/lowering plate 205.

Also, the inner leg portion 190 is arranged on the lower surface of the elevating/lowering plate 205, and the elevating/lowering mechanism 200 includes an urging spring 220 (a coil spring is used in this example) as an urging element that urges the inner leg portion 190 toward the elevating/lowering plate 205.

Further, the elevating/lowering mechanism 200 includes a guide mechanism 225 as a guide element that guides the elevating/lowering plate 205 so as to be capable of moving up and down in a state in which the elevating/lowering plate 205 is prevented from rotating.

Elevating/Lowering Plate

In this example, as illustrated in FIGS. 16 to 18, the elevating/lowering plate 205 is a plate member made of a metal such as SUS and includes a substantially rectangular plate body 206 having substantially the same size as the inner leg portion 190 of the leg part 180, bent flanges 207 extending downward are formed at peripheral edges on three sides of the plate body 206 in the front-rear direction and on the far side in the left-right direction of the apparatus housing 21, and a burred portion 210 having a hole diameter into which the distal end side of the shaft pin 235 of the operation handle 230 may be inserted is formed substantially at the center of the plate body 206.

The burred portion 210 referred to herein is formed by forming a hole in the plate body 206, then forming a flange around the hole so that a rising flange 211 projects upward, and forming a female screw portion 212 on the inner periphery of the rising flange 211. The formation of the female screw portion 212 may be performed simultaneously with the flange formation, or may be performed after the flange formation.

Also, the male screw portion 213 is formed in the region close to the distal end of the shaft pin 235 of the operation handle 230, and the male screw portion 213 is arranged in a state of being screwed into the female screw portion 212 of the burred portion 210.

In this example, the burred portion 210 is formed in the elevating/lowering plate 205, but the configuration is not limited thereto, and a through hole through which the male screw portion 213 of the shaft pin 235 of the operation handle 230 passes may be opened, a nut part may be secured so as to surround the through hole, and the male screw portion 213 of the shaft pin 235 may be screwed into a female screw portion of the nut part.

Also, in this example, the inner leg portion 190 of the leg part 180 is arranged on the lower surface of the elevating/lowering plate 205, and as illustrated in FIG. 18, a through hole 191 through which the male screw portion 213 of the shaft pin 235 may pass is opened at a position corresponding to the burred portion 210 of the elevating/lowering plate 205.

In this example, the elevating/lowering mechanism 200 uses the elevating/lowering plate 205, but a female screw portion may be formed in the through hole 191 of the inner leg portion 190 without using the elevating/lowering plate 205, and the male screw portion 213 of the shaft pin 235 may be screwed thereinto.

Urging Spring and Guide Mechanism

Also, as illustrated in FIGS. 16 to 18, in the guide mechanism 225, a pair of guide pins 226 are secured to the bottom wall 202 of the fixing bracket 201 at substantially symmetrical positions with respect to the front-rear direction of the apparatus housing 21 with the holding hole 237 interposed therebetween by fasteners 227 such as screws, and a pair of guide holes 228 and a pair of guide holes 229 through which the pair of guide pins 226 may pass are opened in the elevating/lowering plate 205 and the inner leg portion 190 of the leg part 180. Although the fasteners 227 are exposed on the outer surface of the bottom wall 202 of the fixing bracket 201, relief holes (not illustrated) for avoiding interference with the fasteners 227 are provided in the step plate portion 102 of the footstep plate 101.

Thus, in this example, the elevating/lowering plate 205 and the inner leg portion 190 of the leg part 180 are guided so as to be able to move up or down along the guide pins 226 in a state of being prevented from rotating by inserting the pair of guide pins 226 into the pairs of guide holes 228 and 229.

Also, in this example, the urging springs 220 are wound around the pair of guide pins 226, and the urging springs 220 are interposed in a compressed state between the inner surface of the bottom wall 202 of the fixing bracket 201 and the lower surface of the inner leg portion 190 of the leg part 180. Accordingly, in this example, the urging springs 220 urge and press the inner leg portion 190 of the leg part 180 toward the elevating/lowering plate 205 side. Thus, when the elevating/lowering plate 205 moves up and down, the inner leg portion 190 of the leg part 180 moves up and down following the elevating/lowering plate 205.

Method of Using Support Part

During Installation of Image Forming Apparatus

Figures 19A, 19B:
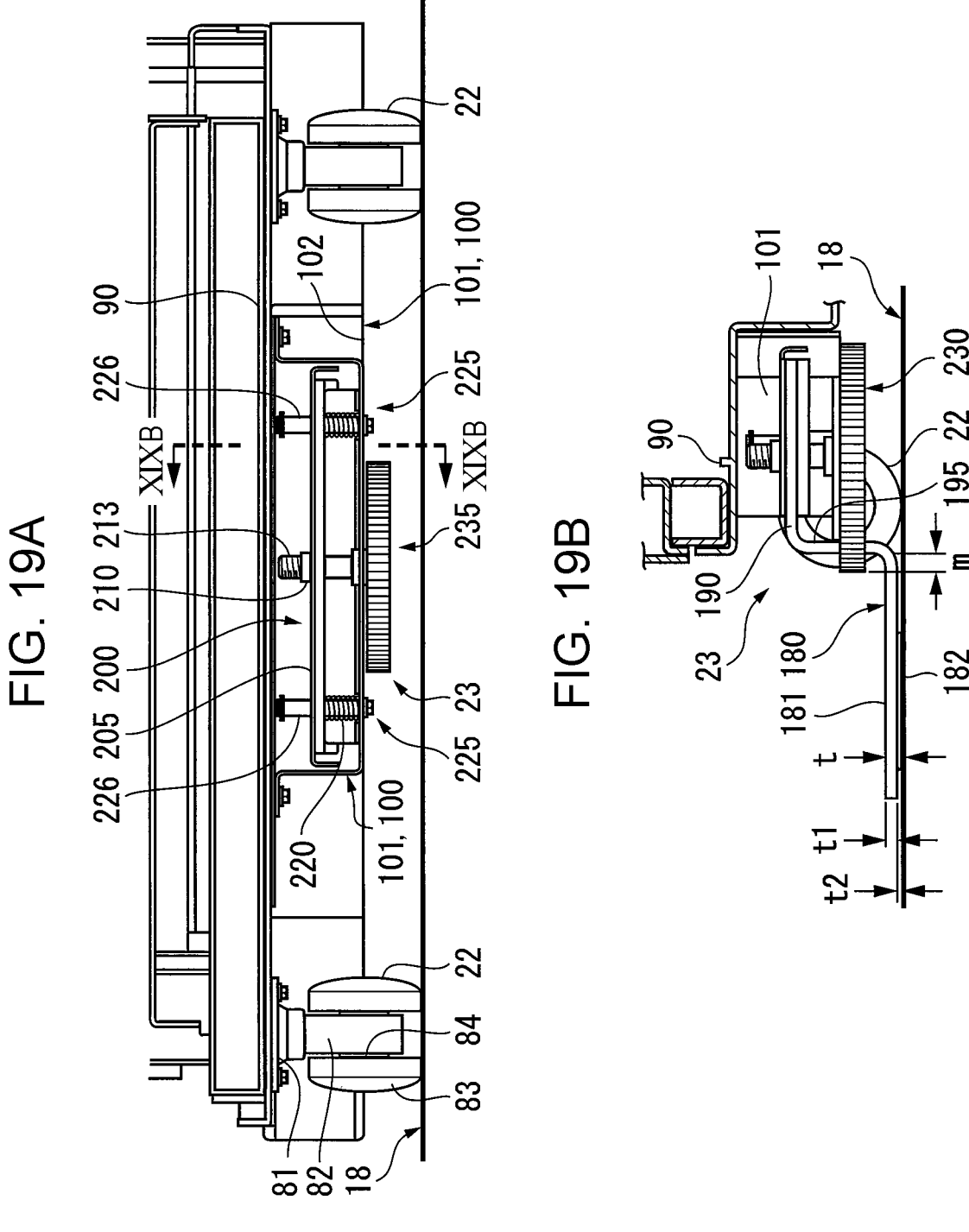
FIG. 19A is an explanatory view illustrating a state at the time of installing the support part.
FIG. 19B is an explanatory cross-sectional view taken along line XIXB-XIXB in FIG. 19A.

When the image forming apparatus 20 is installed, as illustrated in FIGS. 19A and 19B, the operation handle 230 of the support part 23 is rotated in an appropriate direction, and the leg part 180 is lowered so that the outer leg portion 181 of the leg part 180 is brought into contact with the installation surface 18.

In this example, when the operation handle 230 is rotated in the screw thread direction of the male screw portion 213 of the shaft pin 235, the handle body 231 of the operation handle 230 is rotated at a fixed position, and the male screw portion 213 is screwed into the female screw portion 212 of the burred portion 210. In this state, along with the progress of the screwing motion of the shaft pin 235 of the operation handle 230, the elevating/lowering plate 205 is drawn downward and lowered against the urging force of the urging springs 220, and the inner leg portion 190 is lowered against the urging force of the urging springs 220 following the lowering of the elevating/lowering plate 205.

At this time, the rotation moment M acts on the elevating/lowering plate 205 in accordance with the rotation operation of the operation handle 230. However, since the elevating/lowering plate 205 is prevented from rotating by the guide mechanisms 225 (the guide pins 226 and the guide holes 228), the elevating/lowering plate 205 stably moves down along the guide pins 226. Also, the rotation moment M from the operation handle 230 does not directly act on the inner leg portion 190 of the leg part 180, but the rotation moment M indirectly acts from the contact portion of the inner leg portion 190 and the elevating/lowering plate 205 due to the pressure contact with the elevating/lowering plate 205. However, since the inner leg portion 190 of the leg part 180 is prevented from rotating by the guide mechanisms 225 (the guide pins 226 and the guide holes 229), the inner leg portion 190 stably moves down along the guide pins 226.

Further, in this example, the elevating/lowering plate 205 has the bent flanges 207 along the three sides of the plate body 206, and the bent flanges 207 are arranged to face the side plate portions 103 of the footstep plate 101 and the vertical wall which is a part of the bottom frame 90 of the apparatus housing 21 in a state of being close to the side plate portions 103 and the vertical wall. Accordingly, there is no concern that the posture of the elevating/lowering plate 205 is tilted at the time of being lowered, and the elevating/lowering plate 205 is lowered in a state in which the posture in the substantially horizontal direction is kept.

Also, the periphery of the inner leg portion 190 of the leg part 180 is surrounded by the bent flanges 207 surrounding the three sides of the elevating/lowering plate 205, and the three sides of the inner leg portion 190 are arranged to face the bent flanges 207 of the elevating/lowering plate 205 in a state of being close thereto. Accordingly, there is no concern that the posture of the inner leg portion 190 is tilted at the time of being lowered, and the inner leg portion 190 is lowered in a state in which the posture in the substantially horizontal direction is kept.

Also, in a state in which the leg part 180 is in contact with the installation surface 18, as illustrated in FIGS. 16, 19A, and 19B, the outer leg portion 181 of the leg part 180 is arranged in contact with the installation surface 18 in a state of protruding outward from the outer side surface of the apparatus housing 21.

At this time, although the thickness t of the outer leg portion 181 is the sum of a thickness t1 of the metal plate member portion and a thickness t2 of the elastic member 182 on the back surface side, since the thickness t may be suppressed to about 7 to 10 mm, there is little concern that the outer leg portion 181 interferes with passage.

Further, in this example, as illustrated in FIG. 14, since the outer leg portion 181 has the length dimension L1 larger than the length dimension L0 in the front-rear direction of the apparatus housing 21 on each of both sides in the left-right direction of the apparatus housing 21, assuming that a load in an overturning direction acts on the image forming apparatus 20, although the load is transmitted to the outer leg portion 181 via the inner leg portion 190 and the coupling portion 195, the installation surface area of the outer leg portion 181 extends in a wide range in the front-rear direction with the position of the center of gravity of the image forming apparatus 20 interposed, so that the load is efficiently dispersed.

During Conveyance of Image Forming Apparatus

Figure 20A:
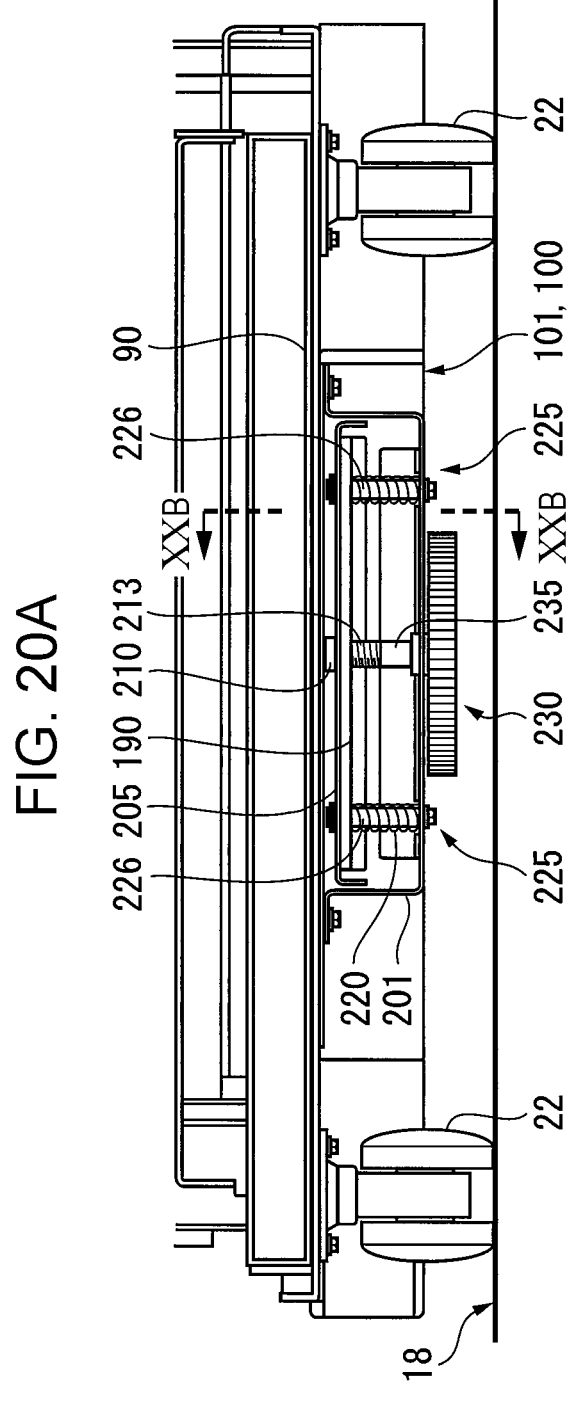
FIG. 20A is an explanatory view illustrating an upward retracted state of the support part.
Figure 20B:
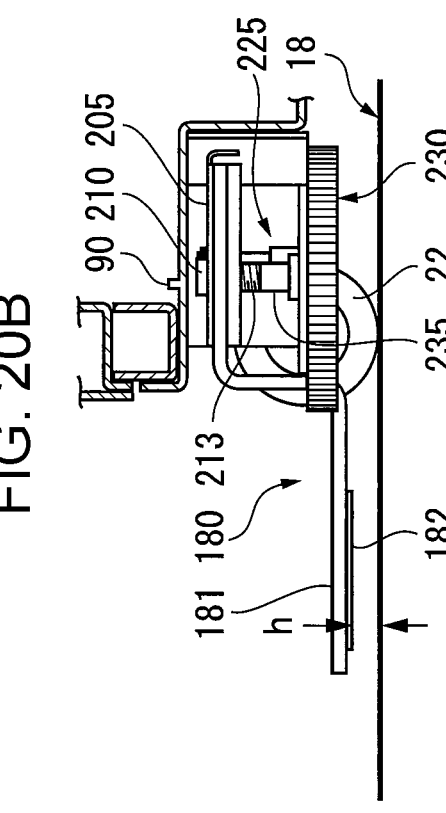
FIG. 20B is an explanatory cross-sectional view taken along line XXB-XXB in FIG. 20A.

In a case where the image forming apparatus 20 is conveyed without detaching the support part 23, as illustrated in FIGS. 20A and 20B, the operation handle 230 of the support part 23 may be rotated in an appropriate direction, and the leg part 180 may be elevated so that the outer leg portion 181 of the leg part 180 is retracted upward from the installation surface 18.

In this example, when the operation handle 230 is rotated in a direction opposite to the screw thread direction of the male screw portion 213 of the shaft pin 235, the handle body 231 of the operation handle 230 is rotated at a fixed position, and the male screw portion 213 is screwed in a direction in which the male screw portion 213 is removed from the female screw portion 212 of the burred portion 210. In this state, the elevating/lowering plate 205 is drawn upward along with the progress of the screwing motion of the shaft pin 235 of the operation handle 230, and the inner leg portion 190 is urged toward the elevating/lowering plate 205 side by the urging force of the urging springs 220 and moves up following the upward movement of the elevating/lowering plate 205.

In this example, an elevating/lowering range of the leg part 180 by the elevating/lowering mechanism 200 depends on a restriction of a place (attached portion) where the elevating/lowering mechanism 200 and the operation handle 230 are accommodated, and a maximum floating amount h of the outer leg portion 181 of the leg part 180 is determined in accordance with the elevating/lowering range by the elevating/lowering mechanism 200.

When the image forming apparatus 20 is conveyed, from the viewpoint of maximizing the conveyability by the caster 22, the maximum floating amount h of the leg part 180 may exceed the height from the installation surface 18 to the center position Q of the wheel 83 of the caster 22. In a case where the maximum floating amount h of the leg part 180 is not sufficiently ensured, if there is an obstacle (not illustrated) on the installation surface 18 and the height dimension of the obstacle is equal to or smaller than the diameter of the caster 22, the caster 22 is able to cross the obstacle. However, there is concern that the leg part 180 having a small maximum floating amount h collides with the obstacle and the conveyability of the image forming apparatus 20 by the caster 22 is impaired.

The rotation preventing motion of the elevating/lowering plate 205 and the inner leg portion 190 of the leg part 180, and the posture tilt suppressing motion are substantially the same as those at the time of installation of the image forming apparatus 20.

Also, when conveying the image forming apparatus 20 with the support part 23 removed, similarly to the first exemplary embodiment, while gripping the vertical arm portion 71a of the support arm 71 provided on the top portion 21a of the apparatus housing 21 as illustrated in FIG. 14, the operator may put the distal end portion of his/her foot MF on the footstep portion FT in a manner that the distal end portion of the foot MF is able to be hooked thereon, tilt the image forming apparatus 20 with the ground contact position of the wheels 83 of the casters 22 (22a and 22b) on both sides of the footstep portion FT as fulcrums, and cross the obstacle as illustrated in FIG. 15A.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A housing structure comprising:

a housing including a top portion and a bottom portion with at least a side portion surrounded by a plane;

a plurality of movable supporters that are provided on the bottom portion of the housing and support the housing via wheels capable of moving the housing while two positions separated from each other in a width direction intersecting with a predetermined advancing direction of the housing on a side opposite to the advancing direction serve as support points;

a grip provided on the top portion or at an upper half portion of the side portion of the housing and being capable of being gripped with a hand of an operator when the housing is tilted; and a footstep that is provided at the bottom portion of the housing between two movable supporters located on the side opposite to the advancing direction of the housing and on which a foot of the operator is able to be hooked when the housing is tilted, wherein the footstep is arranged on an advancing direction side of the housing with respect to center positions of diameters of wheels of the two movable supporters as a boundary.

(((2)))

The housing structure according to (((1))), wherein the footstep includes a footstep portion that is provided below the bottom portion of the housing and on which the operator puts a distal end portion of his/her foot in a manner that the distal end portion of the foot is able to be hooked.

(((3)))

The housing structure according to (((1))) or (((2))), wherein, in the footstep, a member constituting the footstep portion is fixed to a bottom frame constituting the bottom portion of the housing.

(((4)))

The housing structure according to any one of (((1))) to (((3))), wherein the footstep is covered with a detachable covering when not in use, and the covering is removed when in use.

(((5)))

The housing structure according to any one of (((1))) to (((4))), wherein the footstep also serves as an attachment portion to which an overturning-prevention support part is attached.

(((6)))

The housing structure according to any one of (((1))) to (((5))), wherein the footstep is arranged on the advancing direction side of the housing so as to include the center positions of the diameters of the wheels of the two movable supporters.

(((7)))

The housing structure according to any one of (((1))) to (((6))), wherein the footstep is provided between the center positions of the diameters of the wheels of the two movable supporters and the bottom portion of the housing.

(((8)))

The housing structure according to any one of (((1))) to (((7))), wherein the grip is provided so as not to protrude outward from the side portion of the housing.

(((9)))

The housing structure according to (((8))), wherein the grip also serves as a supporter that is provided on the top portion of the housing and supports a reading unit that reads a target to be read placed on the top portion of the housing.

(((10)))

An object comprising:

the housing structure according to any one of (((1))) to (((9))); and various object elements mounted in the housing.

What is claimed is:

1. A housing structure comprising:

a housing including a top portion and a bottom portion with at least a side portion surrounded by a plane;

a plurality of movable supporters that are provided on the bottom portion of the housing and support the housing via a plurality of wheels capable of moving the housing, two wheels of the plurality of wheels being positioned on a side of the housing opposite to a predetermined advancing direction of the housing, being separated from each other in a width direction intersecting the predetermined advancing direction, and providing pivot points when the housing is tilted;

a grip provided on the top portion or at an upper half portion of the side portion of the housing and being capable of being gripped with a hand of an operator when the housing is tilted; and a footstep that is provided at the bottom portion of the housing between two movable supporters located on the side opposite to the predetermined advancing direction of the housing and on which a foot of the operator is able to be hooked when the housing is tilted, wherein the footstep is arranged on an advancing direction side of the housing with respect to center positions of diameters of wheels of the two movable supporters as a boundary and no portion of the footstep is arranged rearward of the center positions of diameters of wheels of the two movable supporters relative to the predetermined advancing direction.

2. The housing structure according to claim 1, wherein the footstep includes a footstep portion that is provided below the bottom portion of the housing and on which the operator puts a distal end portion of his/her foot in a manner that the distal end portion of the foot is able to be hooked.

3. The housing structure according to claim 2, wherein, in the footstep, a member constituting the footstep portion is fixed to a bottom frame constituting the bottom portion of the housing.

4. The housing structure according to claim 1, wherein the footstep is covered with a detachable covering when not in use, and the covering is removed when in use.

5. The housing structure according to claim 4, wherein the footstep also serves as an attachment portion to which an overturning-prevention support part is attached.

6. The housing structure according to claim 1, wherein the footstep is arranged on the advancing direction side of the housing so as to include the center positions of the diameters of the wheels of the two movable supporters.

7. The housing structure according to claim 6, wherein the footstep is provided between the center positions of the diameters of the wheels of the two movable supporters and the bottom portion of the housing.

8. The housing structure according to claim 1, wherein the grip is provided so as not to protrude outward from the side portion of the housing.

9. The housing structure according to claim 8, wherein the grip also serves as a supporter that is provided on the top portion of the housing and supports a reading unit that reads a target to be read placed on the top portion of the housing.

10. An object comprising:

the housing structure according to claim 1; and various object elements mounted in the housing.

11. An object comprising:

the housing structure according to claim 2; and various object elements mounted in the housing.

12. An object comprising:

the housing structure according to claim 3; and various object elements mounted in the housing.

13. An object comprising:

the housing structure according to claim 4; and various object elements mounted in the housing.

14. An object comprising:

the housing structure according to claim 5; and various object elements mounted in the housing.

15. An object comprising:

the housing structure according to claim 6; and various object elements mounted in the housing.

16. An object comprising:

the housing structure according to claim 7; and various object elements mounted in the housing.

17. An object comprising:

the housing structure according to claim 8; and various object elements mounted in the housing.

18. An object comprising:

the housing structure according to claim 9; and various object elements mounted in the housing.

19. A housing structure comprising:

a housing including a top portion and a bottom portion with at least a side portion surrounded by a plane;

a plurality of movable supporting means that are provided on the bottom portion of the housing, for supporting the housing via a plurality of wheels capable of moving the housing, two wheels of the plurality of wheels being positioned on a side of the housing opposite to a predetermined advancing direction of the housing, being separated from each other in a width direction intersecting the predetermined advancing direction, and providing pivot points when the housing is tilted;

grip means provided on the top portion or at an upper half portion of the side portion of the housing and being capable of being gripped with a hand of an operator when the housing is tilted; and footstep means that is provided at the bottom portion of the housing between two movable supporting means located on the side opposite to the predetermined advancing direction of the housing and on which a foot of the operator is able to be hooked when the housing is tilted, wherein the footstep means is arranged on an advancing direction side of the housing with respect to center positions of diameters of wheels of the two movable supporting means as a boundary and no portion of the footstep means is arranged rearward of the center positions of diameters of wheels of the two movable supporting means relative to the predetermined advancing direction.

* * * * *